United States Patent
Kamiyama et al.

(10) Patent No.: US 10,661,464 B2
(45) Date of Patent: May 26, 2020

(54) DRILLING APPARATUS AND DRILLING METHOD

(71) Applicant: Shonan Gosei-Jushi Seisakusho K.K., Kanagawa (JP)

(72) Inventors: Takao Kamiyama, Kanagawa (JP); Takashi Kato, Tokyo (JP)

(73) Assignee: Shonan Gosei-Jushi Seisakusho K.K., Kanagawa (JP)

( * ) Notice: Subject to any disclaimer, the term of this patent is extended or adjusted under 35 U.S.C. 154(b) by 27 days.

(21) Appl. No.: 16/302,181

(22) PCT Filed: Mar. 29, 2017

(86) PCT No.: PCT/JP2017/012789
§ 371 (c)(1),
(2) Date: Nov. 16, 2018

(87) PCT Pub. No.: WO2017/203823
PCT Pub. Date: Nov. 30, 2017

(65) Prior Publication Data
US 2019/0210235 A1    Jul. 11, 2019

(30) Foreign Application Priority Data
May 23, 2016    (JP) ................. 2016-102642

(51) Int. Cl.
*B23B 41/00*    (2006.01)
*B26D 1/44*    (2006.01)
(Continued)

(52) U.S. Cl.
CPC ............. *B26D 1/44* (2013.01); *B26D 3/00* (2013.01); *B26D 5/007* (2013.01); *B26D 5/02* (2013.01);
(Continued)

(58) Field of Classification Search
CPC ....... B23B 41/00; B23B 2215/72; F16L 55/26; B26D 5/007; B26D 5/02; B26D 5/34; B26F 1/16
See application file for complete search history.

(56) References Cited

U.S. PATENT DOCUMENTS 4,951,758 A    8/1990    Sonku et al.
2018/0133918 A1*    5/2018    Itoh .................. F16L 41/04

FOREIGN PATENT DOCUMENTS

GB    2 091 611 A    8/1982
JP    61044509 A  *  3/1986    ............. B23B 41/00
(Continued)

OTHER PUBLICATIONS

International Search Report dated Jun. 20, 2017 issued in corresponding international patent application No. PCT/JP2017/012789.

*Primary Examiner* — Alan Snyder
(74) *Attorney, Agent, or Firm* — Posz Law Group, PLC

(57) ABSTRACT

A drilling apparatus has a work robot mounting a drilling blade and moving inside a main pipe and a photodetector for detecting the contour of an opening image formed on the inner surface of a pipe lining material by illumination light. The opening image is scanned, and a two-dimensional image corresponding to the opening image is generated based on the contour points P0 to P8 detected by the photodetector for display on a display unit. The amount of positional deviation between the center of the two-dimensional image on the display unit and the axial center C of the rotary shaft of the drilling blade is calculated, and the pipe lining material is drilled by moving the drilling blade by the amount of positional deviation in a direction in which the positional deviation is eliminated.

9 Claims, 26 Drawing Sheets

(51) Int. Cl.
*B26D 3/00* (2006.01)
*B26D 5/02* (2006.01)
*B26D 5/34* (2006.01)
*B26F 1/16* (2006.01)
*E03F 7/00* (2006.01)
*F16L 55/26* (2006.01)
*B26D 5/00* (2006.01)

(52) U.S. Cl.
CPC .................. *B26D 5/34* (2013.01); *B26F 1/16* (2013.01); *E03F 7/00* (2013.01); *F16L 55/26* (2013.01)

(56) References Cited

FOREIGN PATENT DOCUMENTS

| | | |
|---|---|---|
| JP | S63-176007 U1 | 11/1988 |
| JP | H02-154891 A | 6/1990 |
| JP | H07-088915 A | 4/1995 |
| JP | 2002-022062 A | 1/2002 |
| JP | 2008-142827 A | 6/2008 |

* cited by examiner

P0'( 0, y0')
P1'(-x1, y1')
P2'(-x2, y2')
P3'(-x2, y3')
P4'(-x1, y4')
P5'( 0, y5')
P6'( x1, y6')
P7'( x2, y7')
P8'( x1, y8')

DRILLING APPARATUS AND DRILLING METHOD

CROSS REFERENCE TO RELATED APPLICATION

This application is a U.S. national stage application of International Application No. PCT/JP2017/012789 filed on Mar. 29, 2017, which claims priority to the Japanese Application No. 2016-102642 filed on May 23, 2016, the contents of which are incorporated herein by reference.

TECHNICAL FIELD

The present invention relates to a drilling apparatus and drilling method for drilling a pipe lining material that blocks a lateral pipe opening.

BACKGROUND ART

When an existing pipe such as a sewer pipe buried underground has deteriorated, a lining method has been used in which the existing pipe is lined with a pipe lining material. The pipe lining material includes a resin absorbing material that is made of a flexible tubular non-woven fabric having a shape corresponding to that of the existing pipe and is impregnated with an uncured liquid setting resin. The resin absorbing material is coated at its external peripheral surface with a highly airtight plastic film. The pipe lining material is inserted into the existing pipe by means of an eversion or pull-in method. The lining material is pressed against the internal circumferential surface of the existing pipe, and the liquid setting resin is heated and cured to carry out the lining.

Since a lateral pipe communicates with a main pipe such as a sewer pipe, the pipe lining material blocks the opening at the end of the juncture of the lateral pipe when the main pipe is lined with the pipe lining material. Therefore, a work robot provided with a drilling machine and a TV camera is transported into the main pipe and operated remotely from aboveground. The cutter (drilling blade) of the drilling machine is driven and rotated to drill through from the main pipe and remove the portion of the pipe lining material that blocks the lateral pipe opening.

However, in this work, the cutter of the drilling machine must be positioned in the longitudinal direction and in the circumferential direction of the main pipe prior to drilling. This is accomplished while monitoring the main pipe interior with a TV camera. However, since there is no marker in the main pipe interior, there are cases in which mistakes are made in positioning.

As a countermeasure, the following Patent Document 1 discloses a method in which a cap member made of conductive or magnetic material is fitted into a branch opening of the lateral and main pipes, and, after lining the main pip, a portion at which the transition of permittivity or permeability of the cap member becomes maximum is detected as the lateral pipe opening using a detector on the in-pipe work robot to drill a hole in the lateral pipe opening that is blocked by the main pipe lining material.

Patent Document 2 disclose an arrangement in which a magnetism generator is disposed on the lateral pipe side; a magnetic detector is moved along the lined main pipe to detect magnetism from the magnetism generator; and a branch opening of the lateral and main pipes is detected to cut the lining material corresponding to the branch opening.

Patent Document 3 discloses an arrangement in which a marker comprised of a coil and a resonator is embedded coaxially with the pipe axis of the lateral pipe, and, after lining the main-pipe, the marker is magnetically excited by a loop antenna that is provided on a drilling robot. In this arrangement, the marker resonates at a resonance frequency when the loop antenna approaches the branch opening, and a position at which the receiving signal from the resonance signal becomes minimum in level is detected as a center position of the branch opening to perform the drilling work.

PRIOR ART DOCUMENTS

Patent Documents

Patent Document 1: JP 2002-22062 A
Patent Document 2: JP 2008-142827 A
Patent Document 3: JP H7-88915 A1

SUMMARY OF INVENTION

Problems to be Solved

However, the arrangement in Patent Document 1 needs to prepare the cap member made of conductive or magnetic material, having the disadvantage that the cap member is expensive to manufacture and the detector cannot precisely detect a position where the transition of permittivity or permeability of the cap member becomes maximum.

The arrangement in Patent Document 2 also has the disadvantage that the magnetism generator must be mounted so as to coincide with the axis of the lateral pipe, and, due to its incomplete positioning, it is difficult to precisely detect the center of the branch opening of the lateral and main pipes.

The arrangement in Patent Document 3 also has the disadvantage that a piezoelectric oscillator such as a quartz oscillator is needed to manufacture the marker, and the excitation signal from the marker is not sharp, making it difficult to detect the center position of the branch opening.

In any Patent Document, the sensor is moved in the longitudinal direction of the main pipe to detect the drilling marker, so that, when the marker is mounted offset in the circumferential direction thereof, the marker cannot be detected. This makes it necessary to move the sensor in the circumferential direction and redo the detection, causing the drilling efficiency to be reduced.

It is therefore an object of the present invention to solve such problems and provide a drilling apparatus and a drilling method being capable of drilling the pipe lining material by easily and effectively detecting the lateral pipe opening that is blocked by the pipe lining material.

Means for Solving the Problems

The present invention relates to a drilling apparatus for drilling a pipe lining material from a main pipe side wherein illumination light from a lateral pipe passes through the pipe lining material that blocks a lateral pipe opening and an opening image corresponding to the lateral pipe opening is formed on the inner surface of the pipe lining material, and the apparatus comprises:

a rotatable drilling blade for drilling the pipe lining material;

a work robot that moves in the longitudinal direction inside a main pipe with the drilling blade mounted thereon so as to be capable of turning in the circumferential direction about an axis extending in the longitudinal direction of the main pipe;

a photodetector having a plurality of photodetector elements arranged in the circumferential direction of the main pipe to scan the opening image in the longitudinal direction and detect its contour points;

an image generating means for generating a two-dimensional image indicating the contour of the opening image based on the contour points detected by the photodetector; and a calculation means for calculating a positional deviation in the longitudinal and circumferential directions between the center position of the generated two-dimensional image and the axial center position of the rotary shaft of the drilling blade;

wherein the pipe lining material is drilled by moving the drilling blade in the longitudinal direction and turning it in the circumferential direction by the amount of positional deviation in a direction in which the positional deviation is eliminated.

The present invention further relates to a drilling method for drilling a pipe lining material from a main pipe side wherein illumination light from a lateral pipe passes through the pipe lining material that blocks a lateral pipe opening and an opening image corresponding to the lateral pipe opening is formed on the inner surface of the pipe lining material, and the method comprises:

moving in the longitudinal direction of the main pipe a work robot on which a rotatable drilling blade for drilling the pipe lining material is mounted so as to be capable of turning about an axis extending in the longitudinal direction of the main pipe;

scanning in the longitudinal direction the opening image formed on the inner surface of the pipe lining material by the illumination light and detecting its contour points using a photodetector having a plurality of photodetector elements arranged in the circumferential direction of the main pipe;

generating a two-dimensional image indicating the contour of the opening image based on the contour points detected and calculating a positional deviation in the longitudinal and circumferential directions between the center position of the generated two-dimensional image and the axial center position of the rotary shaft of the drilling blade; and drilling the pipe lining material by moving the drilling blade in the longitudinal direction and turning it in the circumferential direction by the amount of positional deviation in a direction in which the positional deviation is eliminated.

Effect of the Invention

In the present invention, the opening image is scanned in the longitudinal direction of the main pipe by a photodetector having a plurality of photodetector elements arranged in the circumferential direction of the main pipe to generate a two-dimensional image indicating its contour and calculate a positional deviation in the longitudinal and circumferential directions of the main pipe between the center position of the generated two-dimensional image and the axial center position of the rotary shaft of the drilling blade. Therefore, it is possible with a simple configuration to obtain the positional deviation of the drilling blade from the opening image in the longitudinal and circumferential directions, allowing the drilling blade to be positioned accurately.

MODE OF CARRYING OUT THE INVENTION

The present embodiments according to the present invention will now be described with reference to the attached drawings. The embodiments are described for a case in which a sewer main pipe is exemplified as an existing pipe, and, after lining the sewer pipe with a pipe lining material, a lateral pipe opening blocked by the pipe lining material is drilled through. However, the present embodiments can be applied not only for the sewer pipe, but also for other pipelines whose openings are blocked after lining by the pipe lining material and are drilled through.

EMBODIMENT 1

Figure 1:
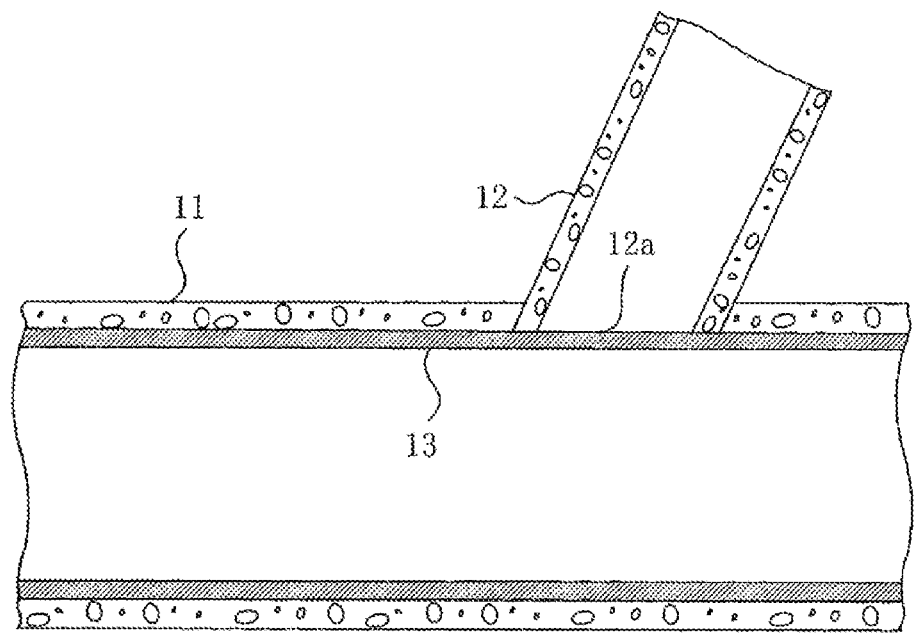
FIG. 1 is an illustrative view showing a state in which a main pipe has been lined.

FIG. 1 shows a state in which an aged sewer main pipe 11 is lined at its inner surface with a pipe lining material 13. As is well known, the lining is performed by introducing the pipe lining material 13 into the main pipe 11 by means of an eversion or pull-in method and pressing it against the inner surface of the main pipe.

The pipe lining material 13 includes a resin absorbing material made of a flexible tubular non-woven fabric and impregnated with an uncured liquid setting resin. For a thermosetting resin, the pipe lining material 13 pressed against the inner surface of the main pipe is heated, while it is irradiated with UV rays for a photo-curable resin. The pipe lining material 13 is then cured to line the inner surface of the main pipe 11.

A plurality of lateral pipes 12 branch off from the main pipe 11, and sewage from homes or buildings is discharged into the main pipe 11 through the lateral pipes 12. Once the main pipe 11 is lined with the pipe lining material 13, the lateral pipe 12 which remained open at an opening 12a is blocked by the pipe lining material 13, as shown in FIG. 1.

Figure 2:
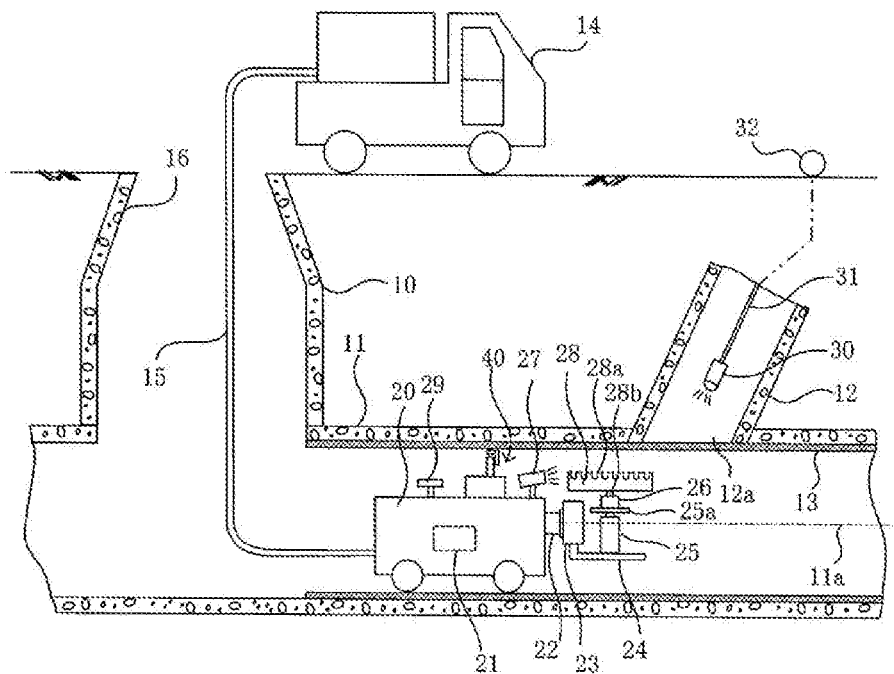
FIG. 2 is an illustrative view showing a state in which a drilling apparatus is moved inside the main pipe.

FIG. 2 shows a drilling apparatus for drilling a hole in the lateral pipe opening that is blocked by the pipe lining material 13.

As shown in FIG. 2, the drilling apparatus includes a work robot 20 that moves inside the main pipe 11 in the longitudinal direction thereof (in the horizontal direction), and a drilling blade 28 is mounted on the work robot 20. The work robot 20 is provided with four wheels, and can be moved forward and backward in the longitudinal direction of the main pipe by driving a motor 21 in the work robot 20 or by winching on the ground a wire (not shown) that is connected to the work robot 20 at the front and rear thereof.

A television camera 27 is mounted on the top of the work robot 20, and is provided at one side with a lighting device (not shown). The main pipe interior illuminated by the lighting device is photographed with the television camera 27. An image photographed is displayed via a signal cable in a cable pipe 15 on a display unit 52 (FIG. 10) inside a work truck 14 installed on the ground so that an operator can monitor the main pipe interior.

A motor 22 is mounted in front of the work robot 20 at the central position in the right and left direction (in the circumferential direction) of the main pipe. A support plate 24 is mounted on the front end of the motor 22 using a mount 23. A hydraulic cylinder 25 provided at the upper portion with a disc-shaped head 25a is fixed on the support plate 24. The hydraulic cylinder 25 is provided at the head 25a with a cylindrical drilling blade 28 having a rotary shaft 28b and a blade surface 28a with many bits circularly arranged at the top. A motor 26 for rotating the drilling blade 28 is mounted on the head 25a with its rotary shaft coaxial with the piston rod of the hydraulic cylinder 25.

Figure 4:
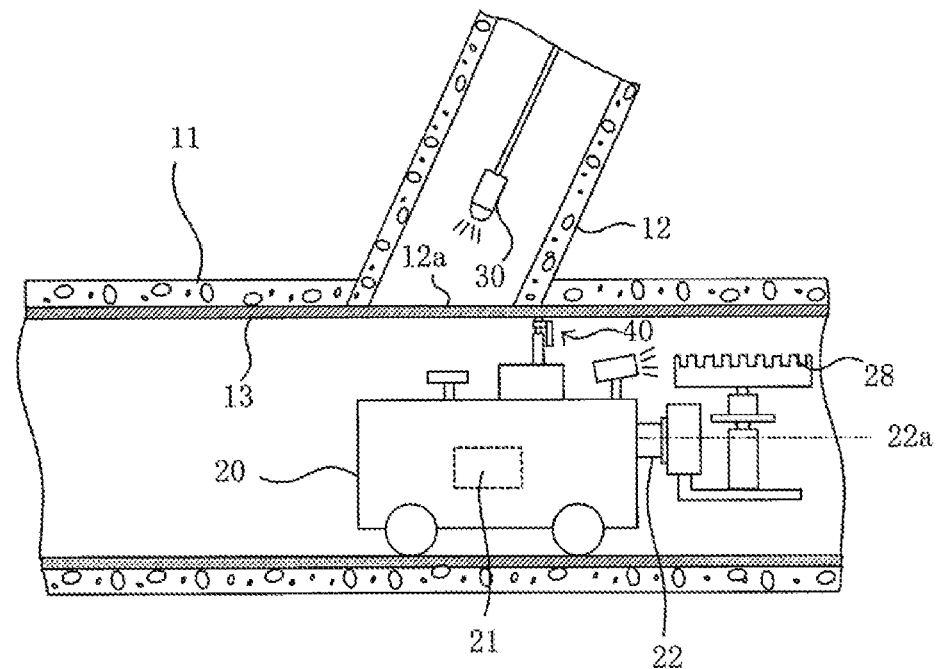
FIG. 4 is an illustrative view showing a state in which the lateral pipe opening image has been scanned.
Figure 5:
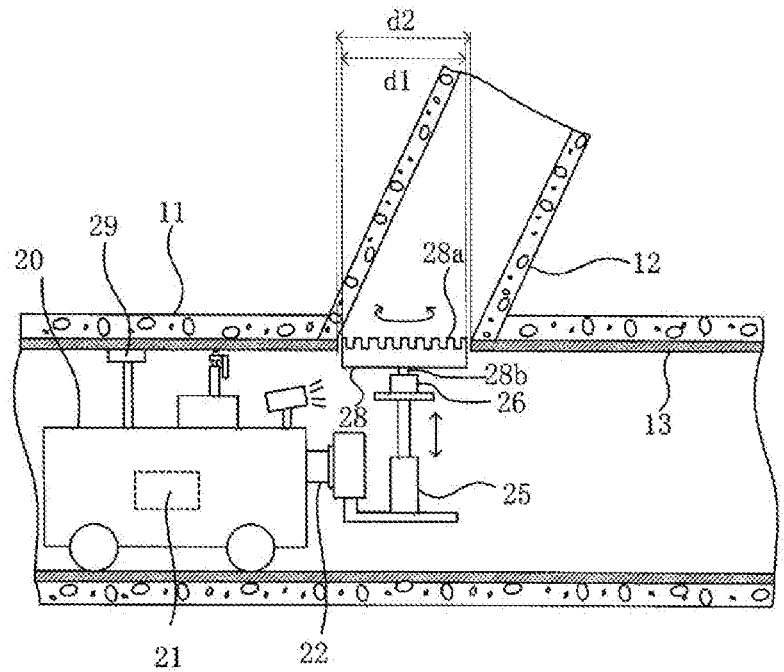
FIG. 5 is an illustrative view showing the drilling of the lateral pipe opening.

The motor 22 has a rotary shaft 22a extending parallel to the pipe axis 11a of the main pipe 11 in the longitudinal direction thereof, and is mounted on the work robot 20 such that the rotary shaft 22a is, for example, coaxial with the pipe axis 11a of the main pipe 11 (FIG. 4) when the work robot 20 takes a normal position inside the main pipe. The rotation of the motor 22 causes the drilling blade 28 to turn in the circumferential direction of the main pipe about the longitudinally extending pipe axis 11a. As shown in FIG. 5, the drilling blade 28 has at the blade surface 28a an outer diameter d1 slightly smaller than the inside diameter d2 of the lateral pipe. The drilling blade 28 is lifted or lowered in the vertical direction by hydraulic pressure using the hydraulic cylinder 25 and is caused to rotate by the motor 26.

The work robot 20 is equipped at the top with a bracing member 29, which is lifted against the upper surface of the pipe lining material 13 in order to stabilize the work robot 20 during drilling.

Figure 7:
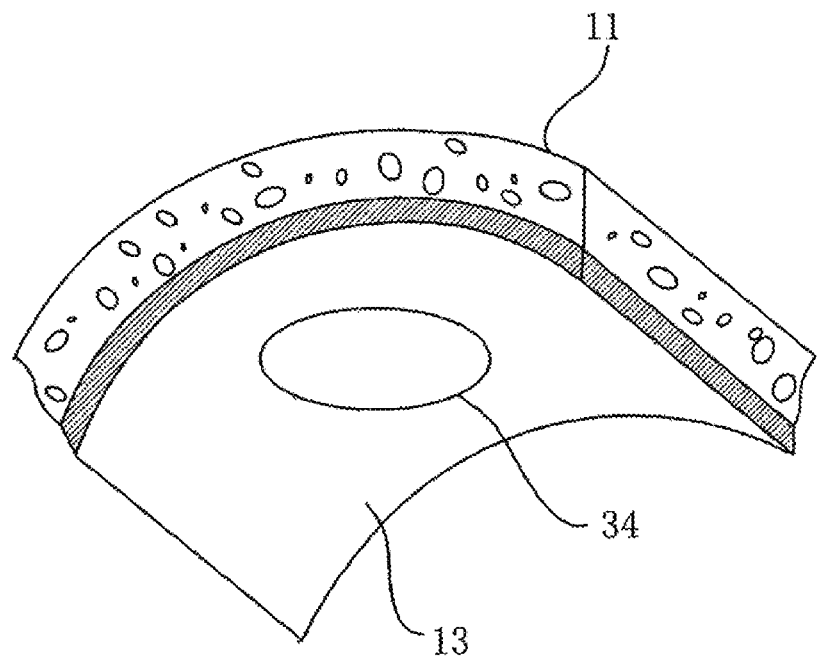
FIG. 7 is a perspective view showing an image of the lateral pipe opening as viewed from the main pipe interior.

When drilling the pipe lining material 13, a lighting lamp 30 is introduced from the ground into the lateral pipe 12, and is lit by a power supply 32 via a power supply line 31 to illuminate from the top the pipe lining material 13 that blocks the lateral pipe opening 12a. Since the pipe lining material 13 is made of a non-woven fabric, illumination light transmits through the pipe lining material even if the resin impregnated therein is cured. When viewing the transmitted light from the main pipe interior, it can be observed as a bright opening image 34 curved corresponding to the inner surface of the main pipe 11, as shown in FIG. 7. For the perpendicular intersection of the lateral pipe 12 with the main pipe 11, the opening image 34 is observed as a circular image, while for the oblique intersection therewith as shown in FIG. 2, it is observed as an elliptical image depending on its inclination.

Figure 9:
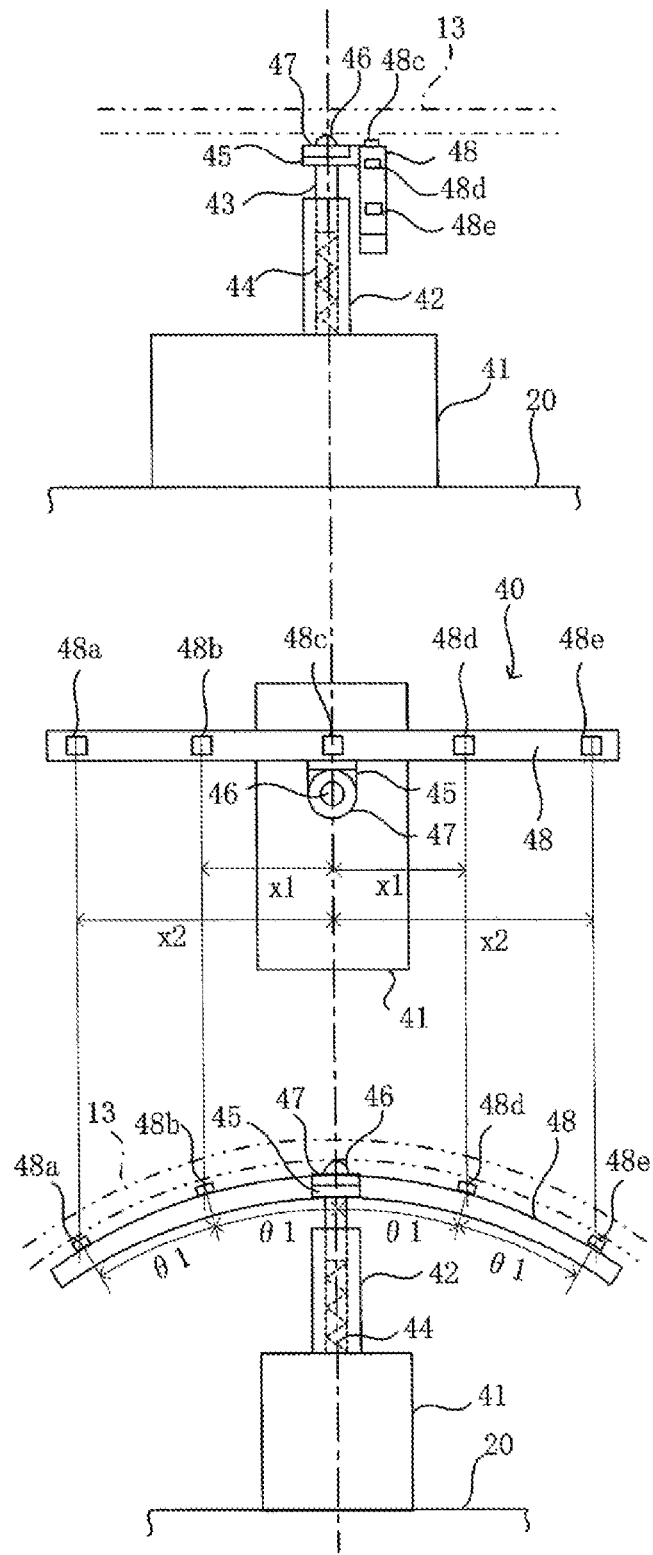
FIG. 9 is a side view, a top view and a front view of a photodetector.

As shown in FIG. 9, a block-shaped base 41 is fixed to the work robot 20. Inside a hollow column 42 provided upward on the base 41, a sensor rod 43 is accommodated which is urged upward by a spring 44 and is movable up and down. A sensor holder 45 and a ball bearing 47 for rolling a metal or resin ball 46 are attached to an upper portion of the sensor rod 43.

As shown in the lower part of FIG. 9, a sensor mount 48 curved in accordance with the curvature of the pipe lining material 13 is fixed to the sensor holder 45. On the upper portion of the sensor mount 48, five photodetector elements 48a to 48e each comprising a CdS (cadmium sulfide) cell or a photodiode are attached at an equal interval θ1 in the circumferential direction of the main pipe. These photodetector elements 48a to 48e constitute a photodetector 40 that optically scans and detects the opening image 34 in the longitudinal direction of the main pipe according to the movement of the work robot 20.

Figure 8:
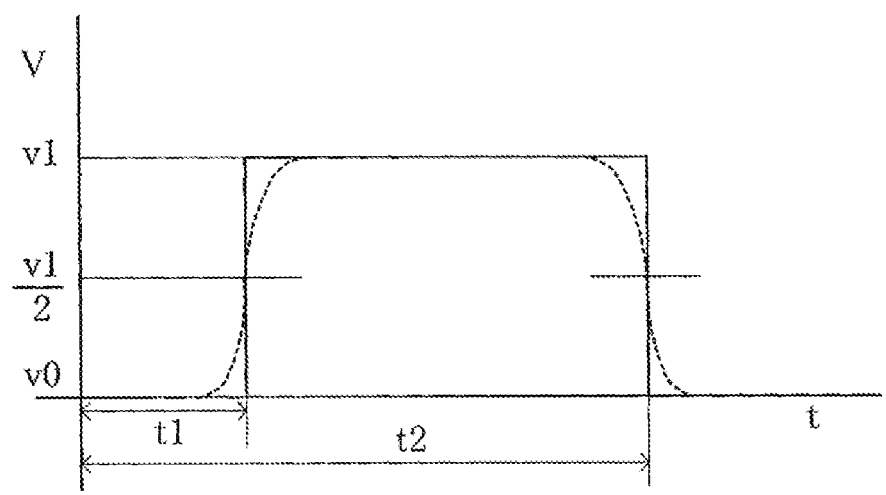
FIG. 8 is a graphic view showing the output waveform relative to elapsed time from an photodetector element when it moves at a constant speed.

FIG. 8 shows the waveform of the output signal relative to the elapsed time t of each of the photodetector elements 48a to 48e when the work robot 20 is moved at a constant speed. Each of the photodetector elements 48a to 48e outputs a voltage from v0 to v1 as shown by a dotted line depending on the brightness of the opening image 34. For example, by setting a threshold voltage of v1/2, the output signal is digitized to generate a high level signal v1 when exceeding it, and otherwise a low level signal v0.

As will be described later, when the work robot 20 moves at a predetermined constant speed, the element of the photodetector 40 detects the first contour of the opening image at time t1 and its output signal changes from a low level to a high level. Subsequently, the output signal of the photodetector element maintains a high level in the bright region corresponding to the diameter d2 of the lateral pipe opening, and switches to the low level when detecting the subsequent contour at time t2. The threshold voltage at which the level is switched can be adjusted according to the brightness of the opening image and the sensitivity of the photodetector element.

Figure 10:
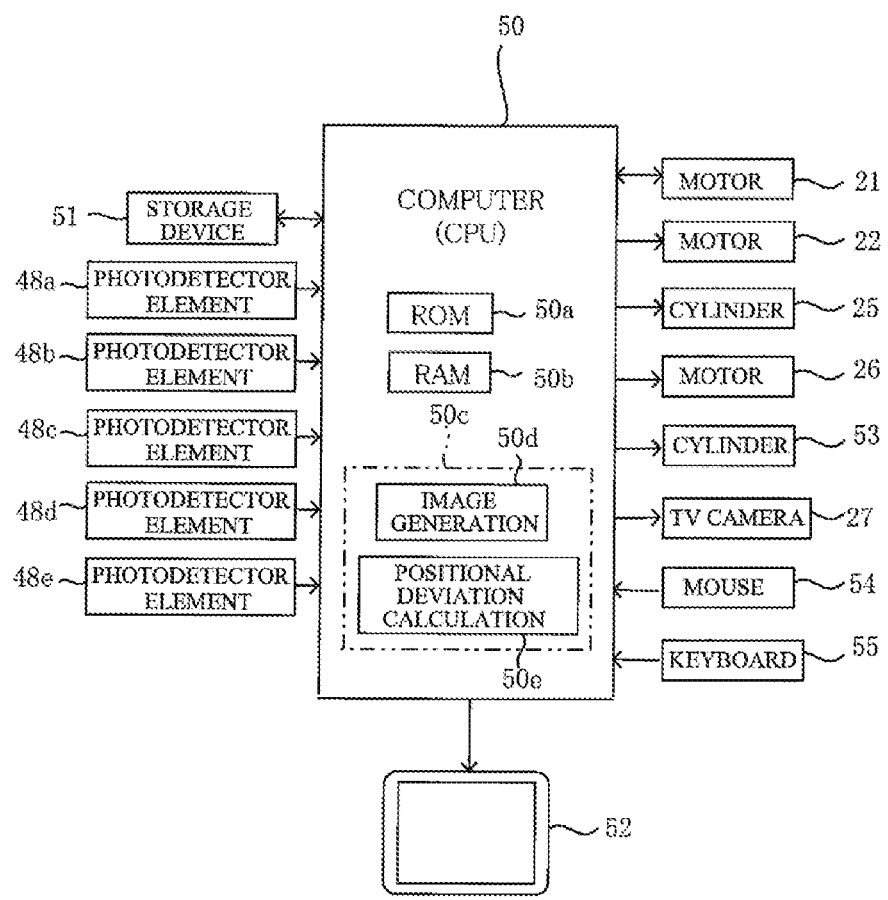
FIG. 10 is a block diagram showing the control configuration of the drilling apparatus.

FIG. 10 shows a block diagram of a control system for controlling the operation of the drilling apparatus. A computer (CPU) 50 as control means and computing means has a ROM 50a for storing basic programs and the like and a working RAM 50b for storing processing data, calculation data and the like.

The computer 50 includes an image processing unit 50c with an image generating unit 50d in which the signals outputted from the photodetector elements 48a to 48e are processed to generate a two-dimensional image corresponding to the opening image. The image processing unit 50c also has a positional deviation calculation unit 50e in which a positional deviation is calculated between the center position of the generated two-dimensional image and the axis center of the rotary shaft 28b of the drilling blade 28 positioned at the end of scanning of the opening image 34. The image processing unit 50c further performs various image processing necessary for image formation. Furthermore, a storage device 51 including a hard disk for storing control programs, image processing programs, templates and the like is connected to the computer 50.

The motor 21 is constituted by, for example, a DC motor equipped with a rotary encoder, and moves the work robot 20 back and forth in the longitudinal direction of the main pipe. The rotational speed of the motor 21 is inputted to the computer 50 to calculate the movement speed and movement distance of the work robot 20.

The motor 22 is constituted by a stepping motor or a servomotor equipped with a rotary encoder with its motor shaft 22a coaxial with the pipe axis 11a of the main pipe 11 and rotates the drilling blade 28 clockwise or counterclockwise in increments of a predetermined angle around the motor shaft 22a. The computer 50 drives the hydraulic cylinder 25 to vertically move the drilling blade 28, drives the motor 26 to rotate the drilling blade 28, drives a hydraulic cylinder 53 to move the bracing member 29 up and down. Furthermore, the computer 50 controls the attitude of the television camera 27 to capture an image photographed by the television camera 27.

A display unit 52 is connected to the computer 50 to display thereon the contour points of the detected opening image, the two-dimensional image generated based thereon, the image photographed with the television camera, calculated data, control data and the like. A mouse 54 and a keyboard 55 are connected to the computer 50. The computer 50, the storage device 51, the display unit 52, the mouse 54, and the keyboard 55 are mounted on the work truck 14 as a part of the drilling apparatus.

The motors 21, 22, 26 and the hydraulic cylinders 25, 53 are connected to a power source mounted on the work truck 14 via a power cable in the cable pipe 15, and are controlled by the computer 50. These driving means can individually be driven and controlled via switches, joysticks or the like disposed on the console in the work truck. The image data photographed by the television camera 27 or the signals from the photodetector elements are inputted to the computer 50 via a signal cable in the cable pipe 15.

Next, the operation of the drilling apparatus thus configured will be described with reference to the flow shown in FIG. 11.

The work robot 20 is introduced into the main pipe 11 through the manhole 16 and moves forward in the main pipe 11 (step S1). At this time, the ball 46 urged upward by the spring 44 rolls in point contact with the inner surface of the pipe lining material 13. Therefore, the photodetector elements 48a to 48e attached to the sensor mount 48 come close to the inner surface of the pipe lining material 13 at an equal distance in the radial direction without contact of its detection surface with the inner surface of the pipe lining material 13, and optically detect the brightness of the opening image 34.

Figure 12:
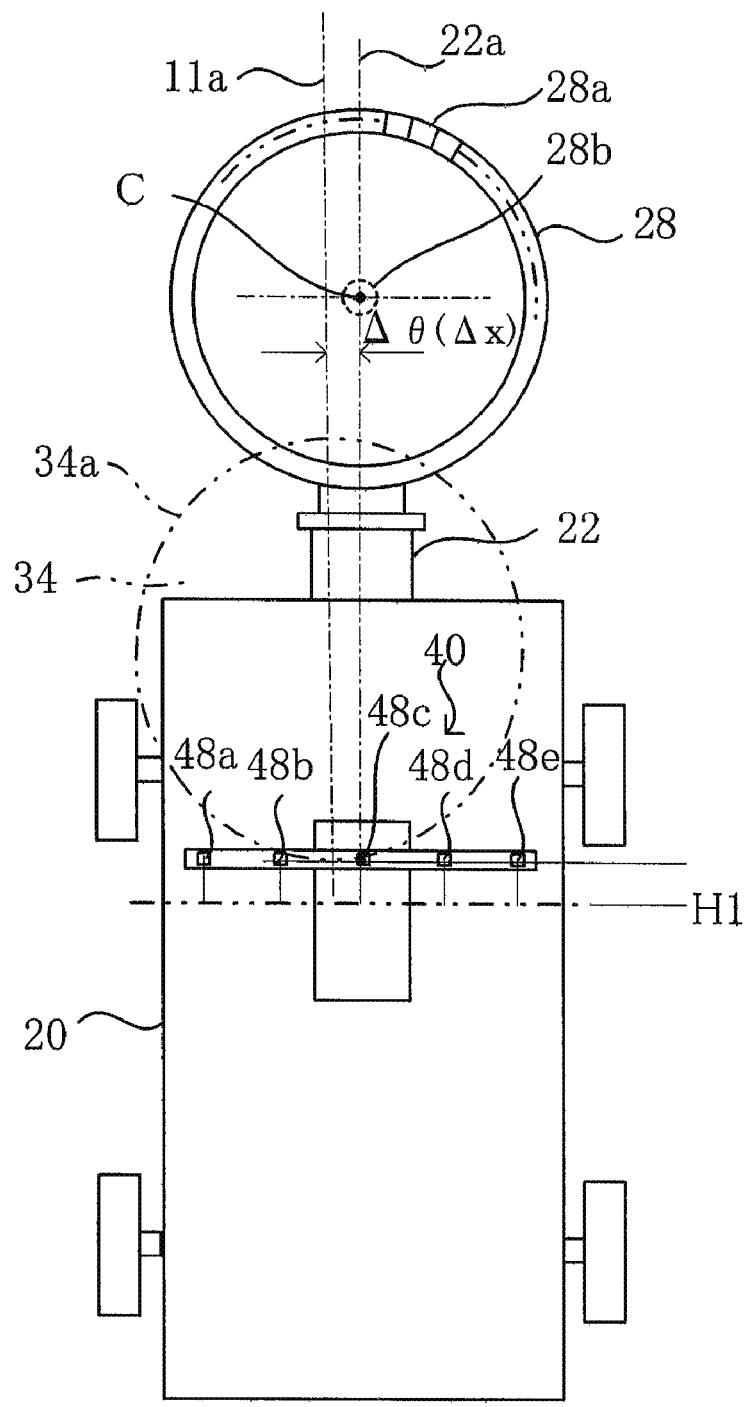
FIG. 12 is an illustrative view showing the scanning of the lateral pipe opening image.

The work robot 20 does not always advance in a vertical posture. For example, as shown in FIG. 12, the work robot 20 advances in a state in which it rolls a bit in the clockwise direction $\Delta\theta$ around the pipe axis 11a of the main pipe 11. In this state, the photodetector 40 is also inclined by $\Delta\theta$, so that the photodetector elements 48a to 48e detect the opening image 34 indicated by an imaginary line in an position shifted to the right rather than bilaterally symmetrical. This $\Delta\theta$ is shown in FIG. 12 as the shift amount $\Delta x$ when viewed from above.

Figure 3:
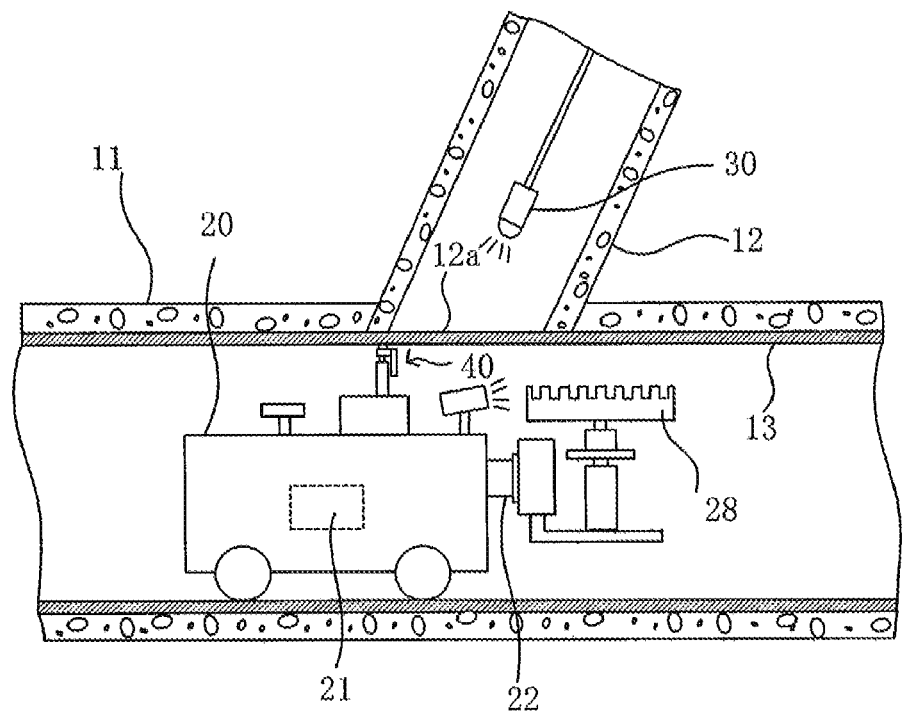
FIG. 3 is an illustrative view showing the scanning of a lateral pipe opening image.

When the work robot 20 continues to advance and the photodetector 40 approaches the opening image 34, either one of the photodetector elements 48a to 48e, for example, the central photodetector element 48c detects the point on the contour line 34a of the opening image 34, and the output signal of the photodetector element 48c is switched from the low level to the high level at this contour point. The position of the work robot 20 at this time is also shown in FIG. 3.

When any one of the light detecting elements 48a to 48e detects the contour point of the opening image 34 (Yes at step S2), the work robot 20 is moved backward by a predetermined distance, and this position is set as the scanning start position H1 for the opening image 34 (Step S3). The scanning start position H1 is a home position for obtaining the coordinates of the contour point of the opening image 34.

Figure 13:
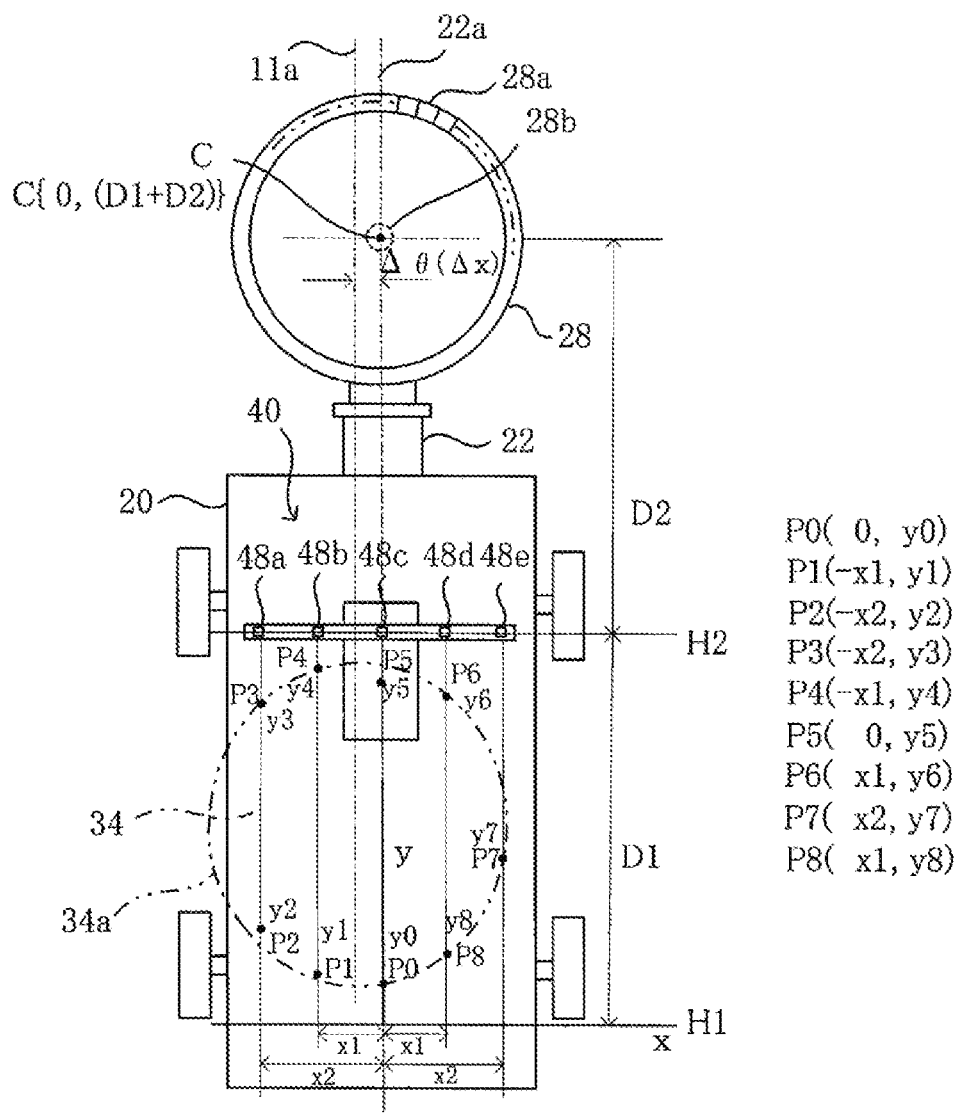
FIG. 13 is an illustrative view showing the detection of contour points on the lateral pipe opening image.

Since the diameter of the lateral pipe 12 has various diameters, a dimension D1 which is a predetermined distance longer than the maximum diameter of the used lateral pipe is set. The work robot 20 is, as shown in FIG. 13, moved in the longitudinal direction of the main pipe from the scanning start position H1 by a distance D1 over the opening image 34. The working robot 20 is then caused to stop there. The stop position H2 of the work robot 20 is set as the scanning end position of the opening image.

While the work robot 20 moves from the scanning start position H1 to the scanning end position H2, the opening image 34 is two-dimensionally scanned (step S4). When the work robot 20 moves forward as shown in FIG. 13, the photodetector elements 48a to 48e are respectively switched from the low level to the high level to detect the front contour points P2, P1, P0, P8 and P7. The work robot 20 further advances and the photodetector elements 48a to 48d are switched from the high level to the low level to detect the rear contour points P3, P4, P5, and P6. In the example of FIG. 12, the contour of the opening image 34 is blurred, so that the contour points P2 and P5 are detected offset from the contour line 34a of the opening image 34. The working robot 20 is further inclined by Δθ, so that the rightmost photodetector element 48e can detect only the front contour point P7.

For the largely inclined working robot 20, it is sometimes impossible to detect the contour of the opening image. Therefore, it is determined whether a plurality of contour points, for example, 6 or more contour points are detected (step S5). When the detection failed, the process returns to step S3 to retract the work robot 20 to the scanning start position H1, and the same processing is repeated until a predetermined number of contour points are detected.

When the determination in step S5 is affirmed, the computer 50 calculates the coordinate values of the contour points P0 to P8. The y-axis when computing the coordinate value is, for example, set to an axis which is parallel to the pipe axis 11a of the main tube 11 and passes through the position of the photodetector element 48c centered in the circumferential direction. The x-axis is set to a horizontal axis that is perpendicular to the y-axis and passes through the scanning start position H1 of the central photodetector element 48c. Since the y-axis is set at the center in the circumferential direction of the work robot 20, it is located directly above the axis center C of the rotary shaft 28b of the drilling blade 28. The vertical line passing through the scanning start position H1 is orthogonal to the x-axis.

The computer 50 has a time counter for each of the light detecting elements 48a to 48e. Each time counter is activated simultaneously with movement of the work robot 20 from the scanning start position H1 to measure the time t1 (FIG. 8) until each of the photodetector elements 48a to 48e is switched from the low level to the high level.

The rotation speed of the motor 21 is measured with the rotary encoder, and the movement speed of work robot 20 is obtained based on its wheel diameter. The movement speed of the work robot 20 is multiplied by the time t1 until switching from the low level to the high level to derive therefrom the movement distances (distances to the contour points) y2, y1, y0, y8, y7 in the y-axis direction (in the longitudinal direction) from the scanning start position H1 of the photodetector elements 48a to 48e to the front contour points P2, P1, P0, P8, P7 of the opening image 34.

Furthermore, the time t2 until each photodetector element switches from the high level to the low level is measured and multiplied by the movement speed to calculate the movement distances y3, y4, y5, y6 in the y-axis direction from the scanning start position H1 of the photodetector elements 48a to 48e to the rear contour points P3, P4, P5, P6 of the opening image 34.

The distance in the x-axis direction of the photodetector elements 48a to 48e from the photodetector elements 8c is x2, x1, 0, x1, and x2 as shown in the center of FIG. 9. Therefore, when the contour points P0 to P8 of the opening image 34 are projected onto the xy plane defined by the xy axis, the xy coordinate values of the contour points P0 to P8 are as shown in the right side of FIG. 13.

The calculation of the coordinate values of such contour points P0 to P8 is performed by the image generating unit 50d of the image processing unit 50c. The image generating unit 50d adds contour points by interpolating the contour points P0 to P8 if necessary and uses a spline curve, for example, to connect the contour points P0 to P8 and the added contour points and generate a two-dimensional image 35 indicating the contour of the opening image 34 as shown in the upper part of FIG. 14 (step S6).

The xy coordinate value of the axial center C of the rotary shaft 28b of the drilling blade 28 is C{0, (D1+D2)}. As described above, D1 is the longitudinal movement distance from the scanning start position H1 of the work robot 20 in consideration of the dimension that is a predetermined distance longer than the maximum diameter of the lateral pipe. D2 is the longitudinal distance from the photodetector element 48c to the axial center C of the drilling blade 28. D1 can be obtained by activating a time counter at the start of scanning by the work robot 20, then measuring time when the work robot 20 stops at the scanning end position H2, and multiplying the movement speed of the work robot 20. D2 is a value determined by the design value of the work robot 20. The movement distances y0 to y8 and D1 can also be obtained by measuring the rotational speed of the motor 21 using a rotary encoder.

Subsequently, as shown in the upper part of FIG. 14, the two-dimensional image 35 generated by the image generating unit 50d is displayed on the display unit 52 (step S7). At this time, the xy coordinate values of the contour points P0 to P8 are calculated based on the actual distance in the coordinate system set in the work robot 20 and become large, so that they are appropriately reduced to 1/m times for display.

Subsequently, the center position of the two-dimensional image 35 displayed on the display unit 52 is detected (step S8). One method (means) for detecting this center is to use a circular template 36 having a diameter 1/m times the outer diameter d1 (FIG. 5) of the blade surface 28a of the drilling blade 28. The template 36 is read out from the storage device 51, and the template 36 and the two-dimensional image 35 are aligned by dragging the template 36 with, for example, the mouse 54 as shown in the lower part of FIG. 14. The coordinate value C'(–Xc, Yc) of the center C' of the aligned template 36 is calculated and set as the coordinate value indicating the center position of the two-dimensional image 35. Since the template 36 is circular, its center can be easily determined by software.

The alignment as described above corresponds to an operation in which the drilling blade 28 is moved while actually viewing the opening image 34 obliquely upward with the television camera 27 inside the main pipe 11 to align its rotating surface (corresponding to the template 36) with the opening image 34 (corresponding to the two-dimensional image 35).

Another method to detect the center of the two-dimensional image 35 is to use template matching. In this case, the degree of coincidence between the image of the template 36 and the two-dimensional image 35 is computed from the correlation coefficient to determine the position of the template 36 at which the correlation coefficient becomes maximum. The center position C' of the template is set as the center of the two-dimensional image 35. Alternatively, the center of gravity of the two-dimensional image 35 may be computed and its position may be used as the center position of the two-dimensional image 35.

On the other hand, the work robot 20 stops at the position shown in FIG. 13 at the end of scanning, so that the axial center C of the rotary shaft 28b of the drilling blade 28 is at the coordinate position of C{0,(D1+D2)}. Therefore, the positional deviation calculation unit 50e calculates the positional deviation between the center position C'(–Xc, Yc) of the two-dimensional image and the axial center position C{0,(D1+D2)} of the drilling blade (step S9). At this time, since (–Xc, Yc) is the coordinate value in the reduced coordinate system, it is multiplied by m.

Subsequently, the drilling blade 28 is moved by the amount of positional deviation in a direction in which the calculated amount of positional deviation is eliminated (step S10). That is, the work robot 20 is moved backward by (D1+D2)−Yc, and the motor 22 is driven to turn the drilling blade 28 counterclockwise by an angle θ(Δθ) corresponding to Xc.

Figure 6:
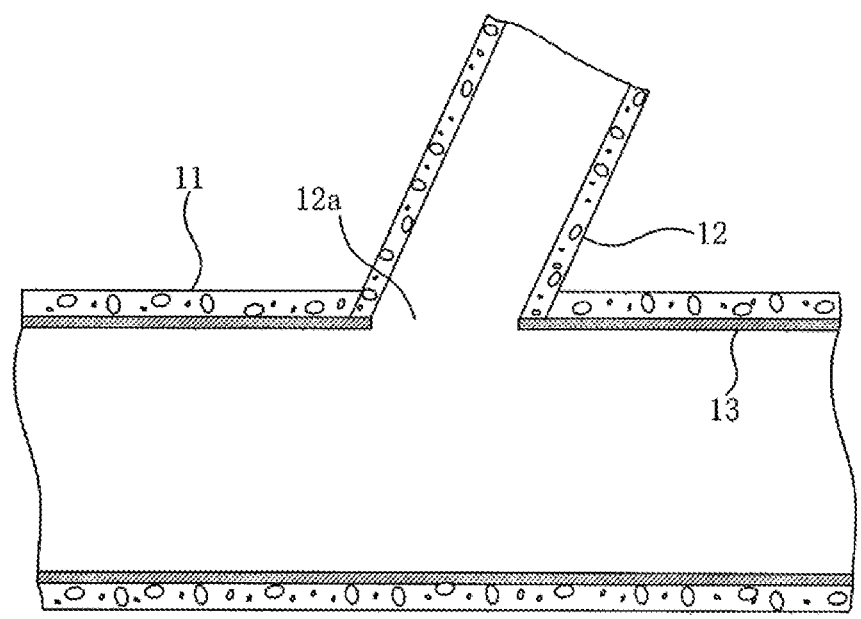
FIG. 6 is an illustrative view showing a state in which a hole is drilled in the lateral pipe opening.

In this state, the template 36 is aligned on the display unit 52 with the two-dimensional image 35. Correspondingly, the blade surface 28a of the drilling blade 28 is also aligned with the opening image 34. Therefore, the hydraulic cylinder 25 is driven to raise the drilling blade 28 and the motor 26 is driven to rotate the drilling blade 28, as shown in FIG. 5. At this time, in order to stabilize the position of the work robot 20, the bracing member 29 is brought into contact with the inner surface of the pipe lining material 13. In this way, the pipe lining material 13 that blocks the lateral pipe opening 12a is drilled, as shown in FIG. 6 (step S11).

In this embodiment, the operation of aligning the blade surface 28a of the drilling blade 28 with the opening image 34 while actually viewing the opening image 34 obliquely upward with the television camera 27 in the main pipe 11 can be performed from the front by displaying the two-dimensional image 35 corresponding to the opening image 34 on the display unit 52. This allows alignment to be made extremely easily. In addition, even if there is an unclear portion in the contour of the actual opening image 34 or even if there is noise light in the opening image 34, it is possible to perform the alignment within a range in which the outline of the two-dimensional image 35 can be identified. This enhances the drilling efficiency.

In the above-described embodiment, five photodetectors are used. However, if the number of photodetectors increases, the number of detected contour points increases and the alignment accuracy improves. Furthermore, in the above-described embodiment, five photodetectors are arranged at equal intervals in the circumferential direction, but the arrangement may be such that the density is varied between the central portion and the end portion.

Figure 15:
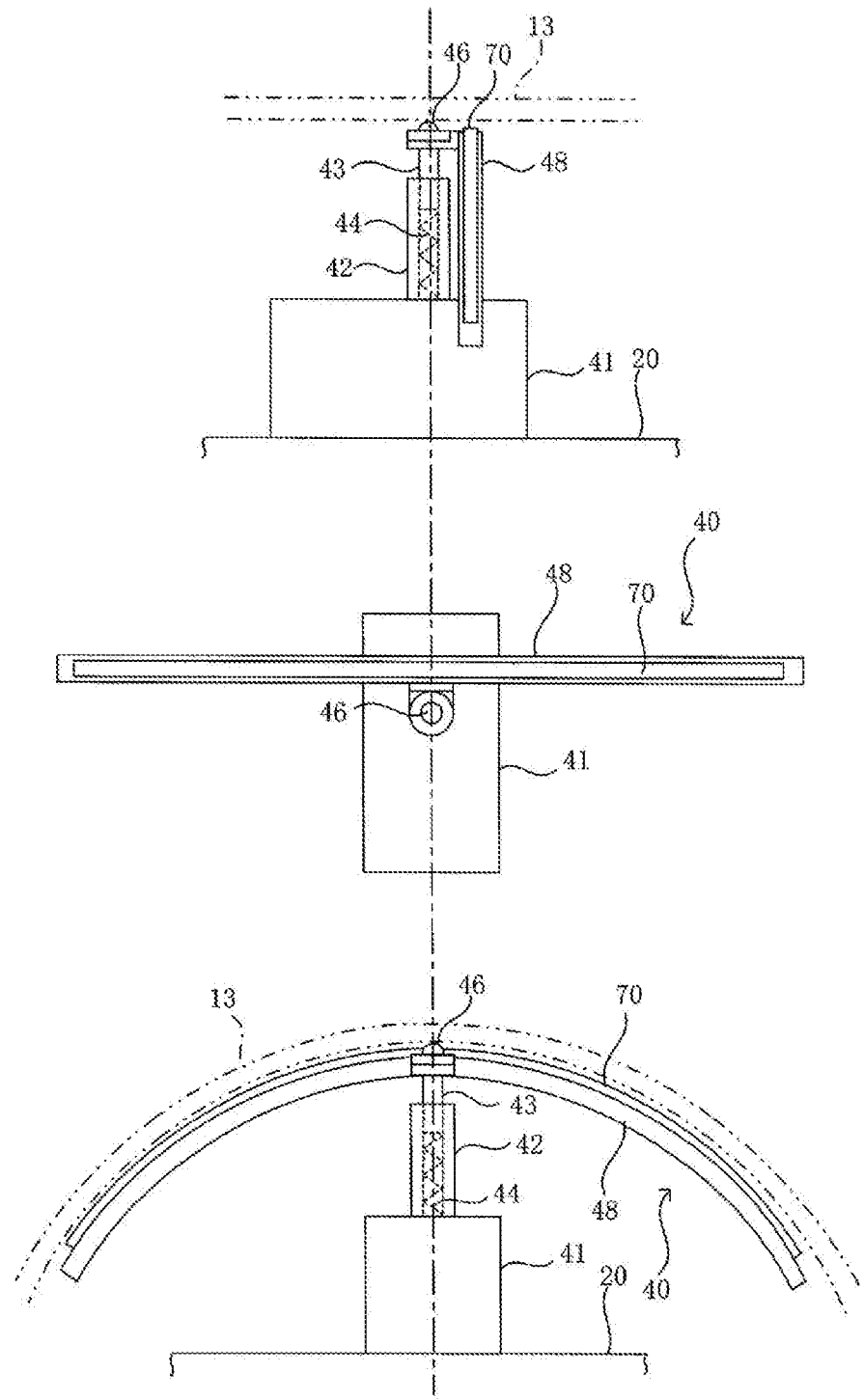
FIG. 15 is a side view, a top view and a front view showing a photodetector according to another embodiment.

A CCD or CMOS image sensor 70 in which minute photodetector elements are arranged one-dimensionally at equal intervals at fine pitches may be used as the photodetector 40. As shown in FIG. 15, the one-dimensional image sensor 70 is attached to a sensor mount 48 extending in a circular arc shape along the circumferential direction of the main pipe.

Figure 16:
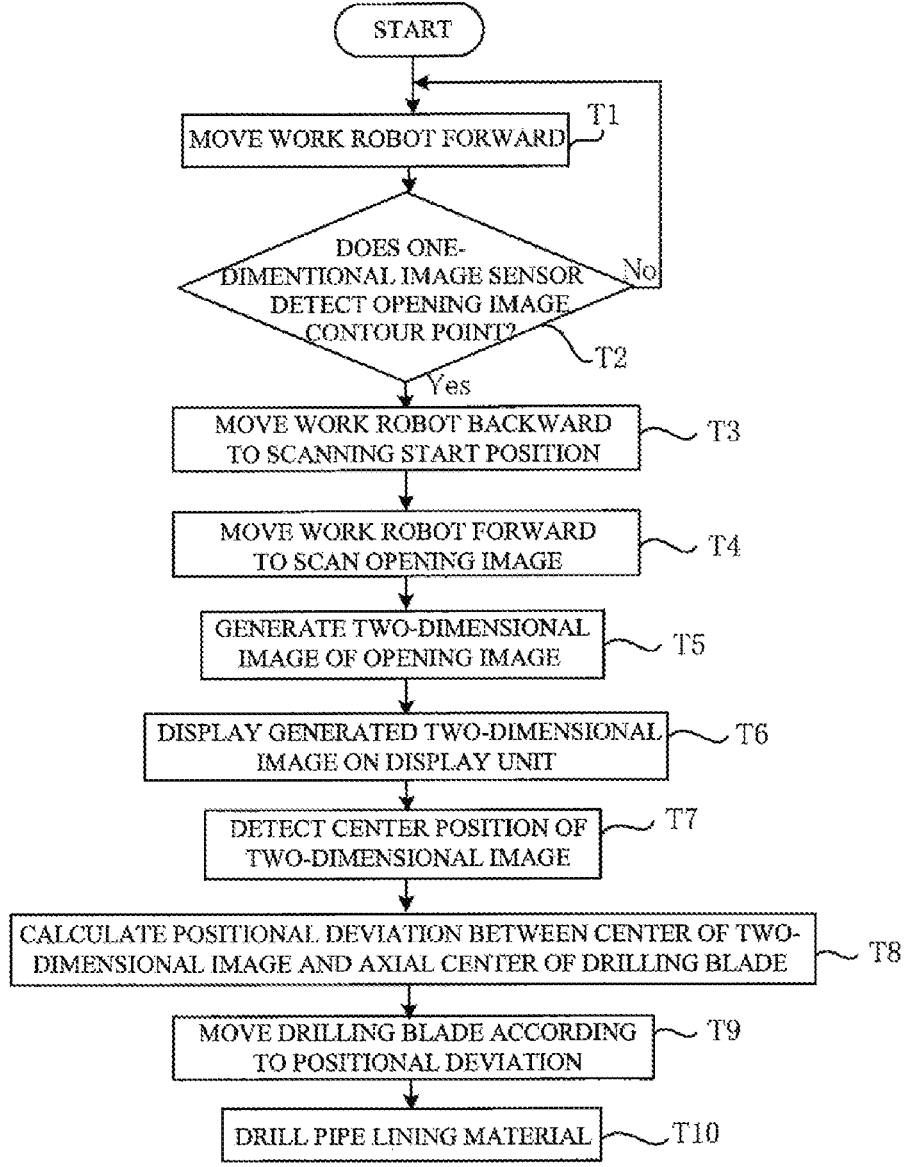
FIG. 16 is a flowchart showing the drilling steps when the photodetector in FIG. 15 is used.
Figure 17:
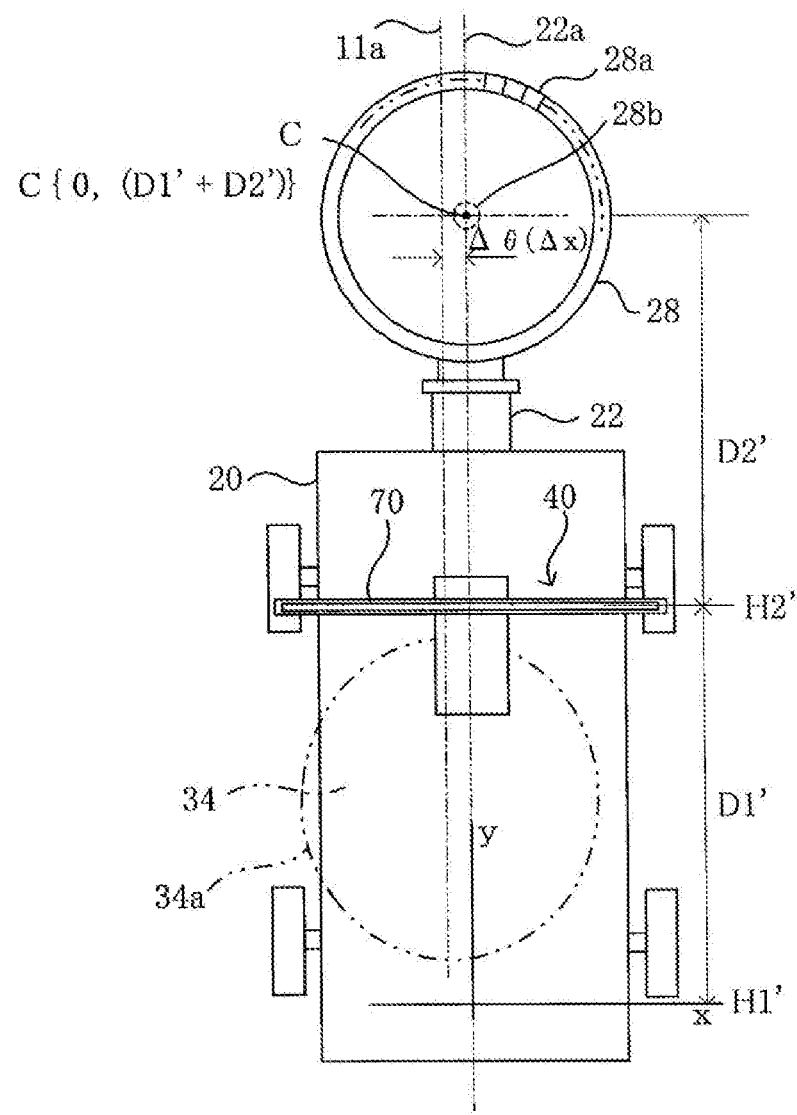
FIG. 17 is an illustrative view showing a state in which the lateral pipe opening image is detected using the photodetector in FIG. 15.

When scanning the opening image 34 using such a one-dimensional image sensor 70, the work robot 20 is moved forward until the one-dimensional image sensor 70 detects any contour of the opening image 34 (steps T1 and T2 in FIG. 16). When the contour is detected, the work robot 20 is moved backward by a predetermined distance (step T3), and this position is set as the scanning start position H1' (step T3). Subsequently, a dimension a predetermined distance longer than the maximum diameter of the lateral pipe is set as D1', and as shown in FIG. 17, the work robot 20 is moved from the scanning start position H1' to the scanning end position H2' located at the distance D1'+D2' over the opening image 34 in order to scan the whole area of the opening image 34 (step T 4). The work robot 20 is then caused to stop in movement. D2' is a value determined by the design value of the work robot 20.

The analog signal detected by each photodetector element of the one-dimensional image sensor 70 is converted into a digital signal indicating the brightness of the minute area of the opening image corresponding to the arrangement pitch of the respective photodetector elements, and is inputted to the computer 50. Signal values for each minute area of the opening image 34 sequentially outputted from the respective photodetector elements of the one-dimensional image sensor 70 in accordance with the movement of the photodetector 40 in the longitudinal direction are sequentially recorded in the RAM 50b.

The image generating unit 50d reads out the signal values of each minute area of the opening image 34 stored in the RAM 50b and generates a two-dimensional image 72 faithfully reproducing the shape of the opening image 34 and its brightness (step T5). As in FIG. 13, the y-axis is set to an axis that is parallel to the pipe axis 11a of the main pipe 11 and passes through the position of the photodetector element at the center of the one-dimensional image sensor 70. The x-axis is set to the horizontal axis orthogonal to the y-axis and passes through the scanning start position H1' of the central photodetector element.

Figure 11:
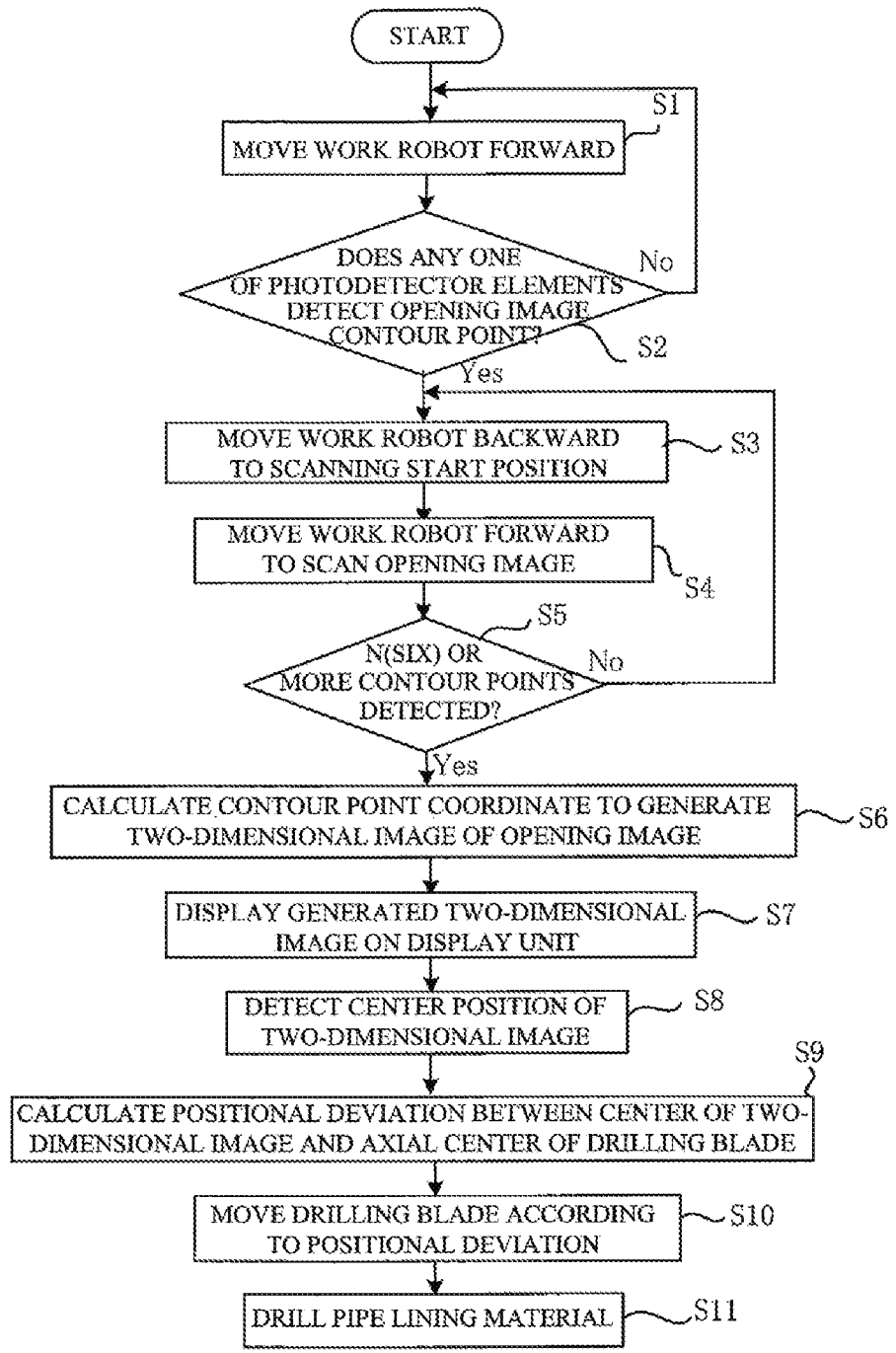
FIG. 11 is a flowchart showing the flow of drilling steps.

Subsequently, the same processing as in steps S7 to S11 in FIG. 11 is performed in steps T6 to T10 to drill the pipe lining material 13.

Figure 18:
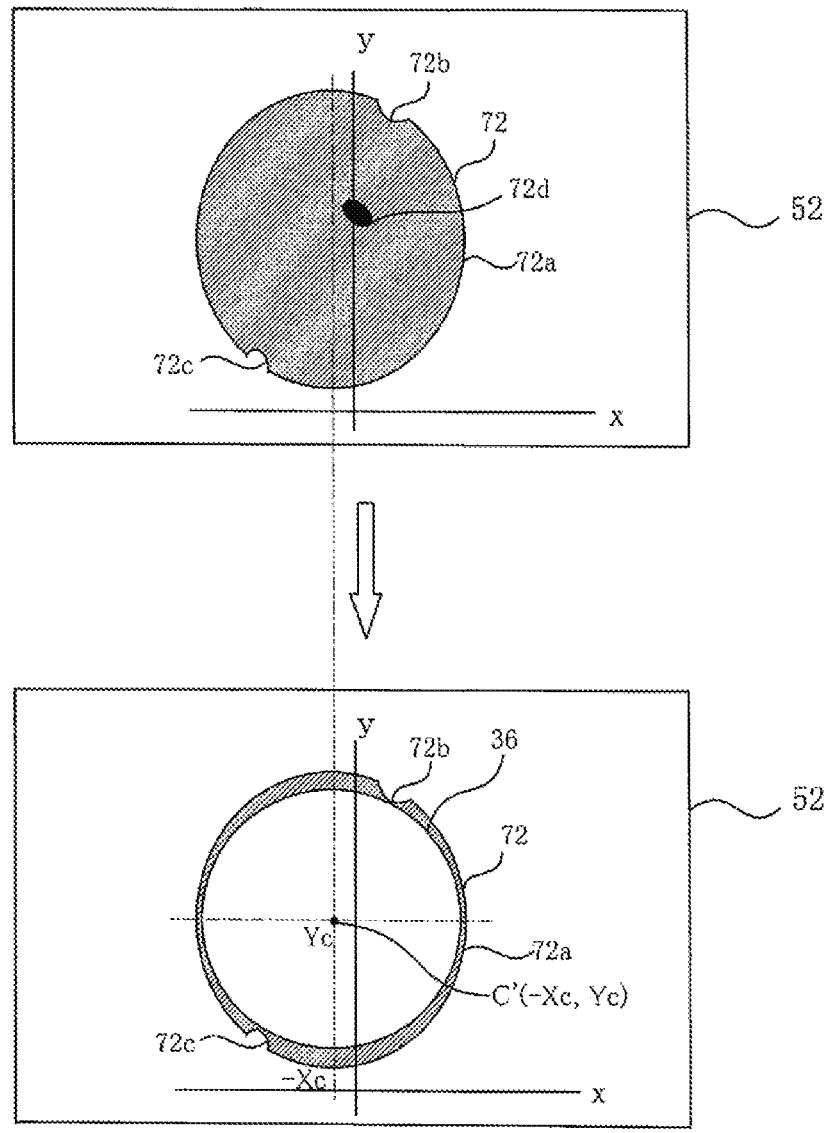
FIG. 18 is an illustrative view showing a state in which the template for the drilling blade is aligned with the two-dimensional image of the opening image that is acquired using the photodetector in FIG. 15.

In the case of using the one-dimensional image sensor 70, the whole area of the opening image 34 is displayed on the display unit 52 with a resolution corresponding to the fine pitch of the photodetector element. In FIG. 18, the contour line 72a of the two-dimensional image 72 is illustrated as a solid black line, but actually expressed as a linear contour having different shading corresponding to the brightness of the rising portion or the falling portion of the signal as is indicated by the dotted line in FIG. 8. Further, the peripheral areas 72b, 72c of the two-dimensional image 72 appear as missing images because dirt accumulates there in the lateral pipe opening 12a, and the central area 72d is reproduced as a noise image.

Figure 14:
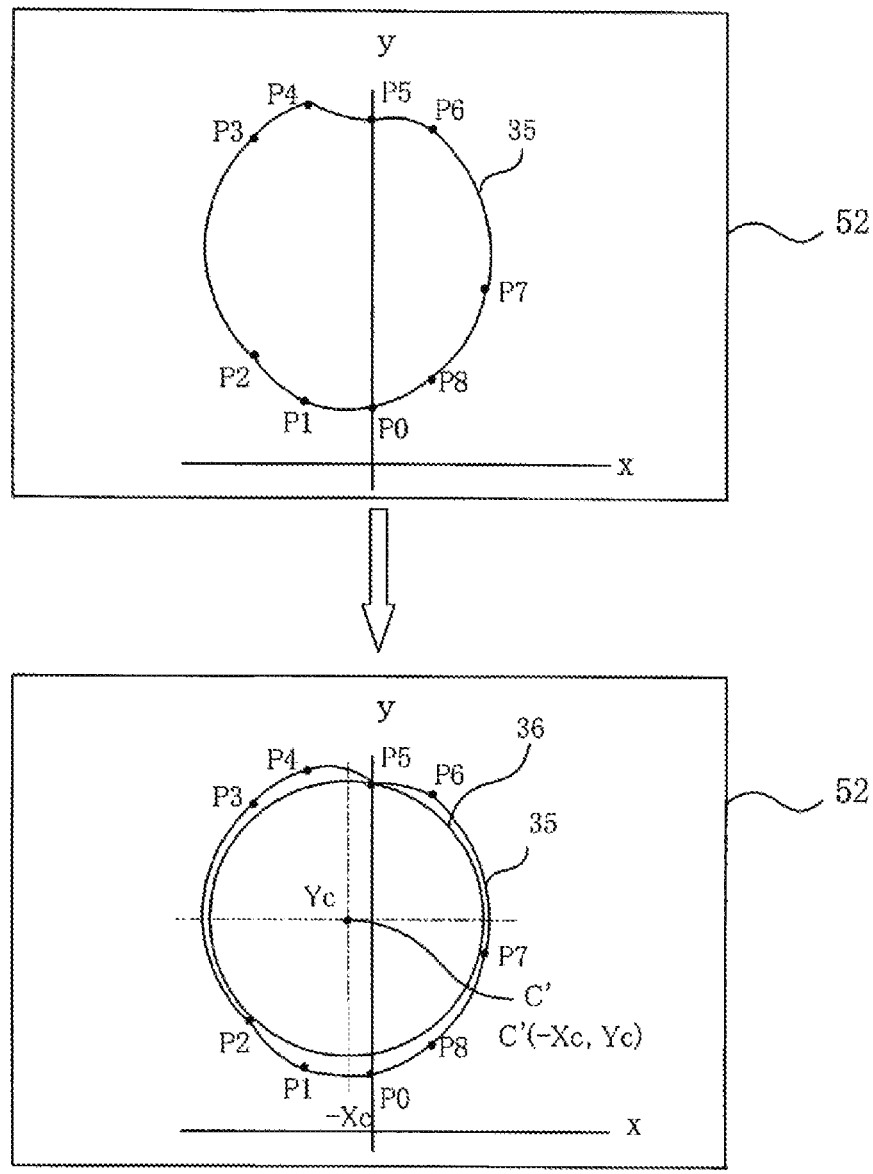
FIG. 14 is an illustrative view showing a state in which a template for the drilling blade is aligned with the two-dimensional image of the opening image.

The coordinate value of the axial center C of the rotary shaft 28a of the drilling blade 28 is C{0,(D1'+D2')}, and the center position of the two-dimensional image 72 is obtained as C'(−Xc, Yc) as in FIG. 14. Therefore, the work robot 20 is retracted by the amount of positional deviation (D1'+D2')−Yc and the motor 22 is driven to turn the drilling blade 28 in the counterclockwise direction by an angle θ(Δx) corresponding to the difference Xc (Δx) on the x-axis to drill the pipe lining material 13 that blocks the opening of the lateral pipe 12.

In the case of using the one-dimensional image sensor 70, the entire area of the opening image 34 is faithfully displayed on the display unit 52 as a two-dimensional planar image, so that positioning is facilitated and its positioning accuracy is improved.

Figure 19:
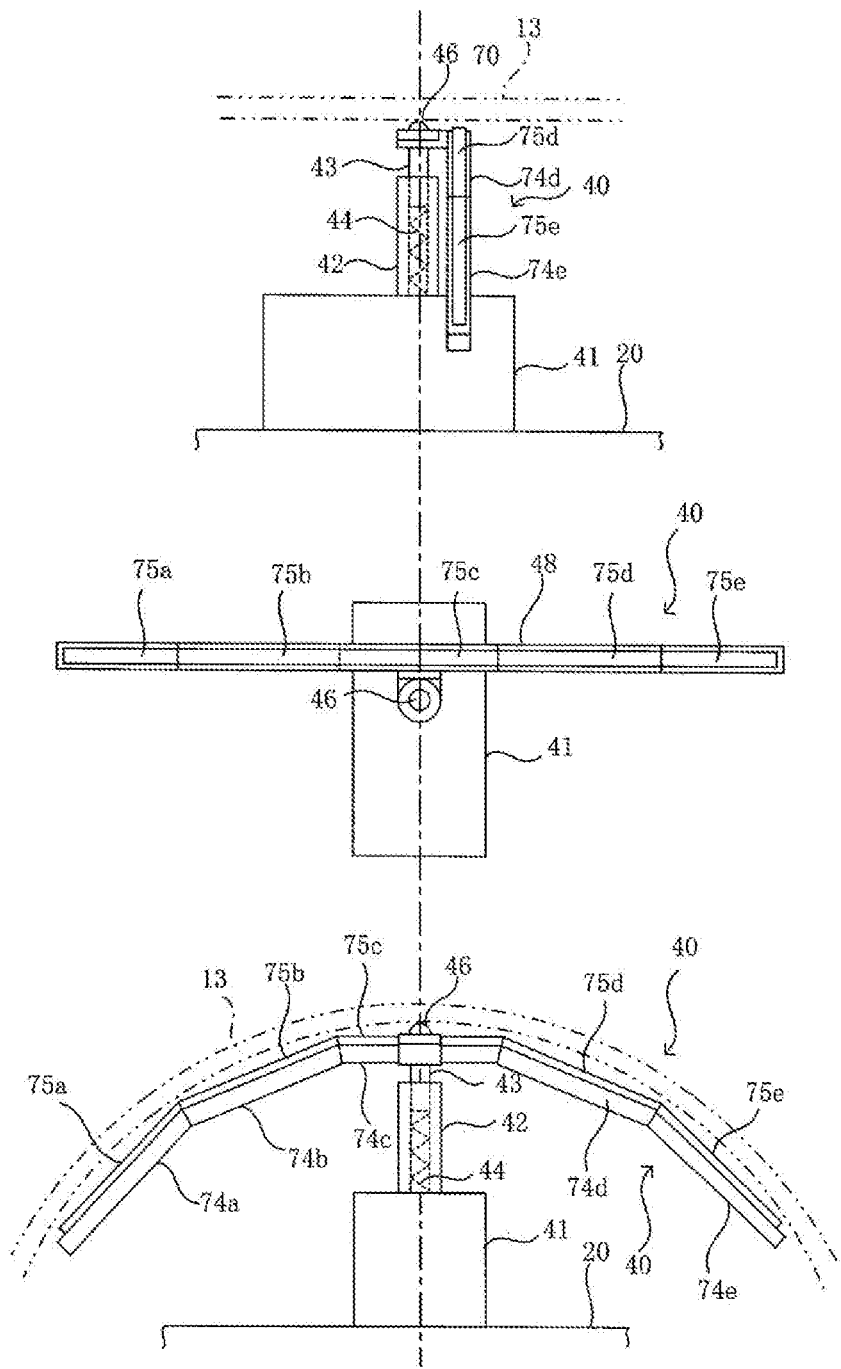
FIG. 19 is a side view, a top view and a front view showing a photodetector according to still another embodiment.

As shown in FIG. 19, the photodetector 40 may be constituted by a one-dimensional image sensor in which a plurality of linearly extending one-dimensional image sensors 75a to 75e are arranged along the circumferential direction of the main pipe. In this case, the respective one-dimensional image sensors 75a to 75e are attached to linearly extending sensor attachments 74a to 74e that are arranged in the circumferential direction of the main pipe.

The image generating unit 50d generates a two-dimensional image showing the contour of the opening image 34 according to the signals sequentially detected by the respective one-dimensional image sensors 75a to 75e in accordance with movement of the working robot 20. In this case, the radial distance between each photodetector element of each linear one-dimensional image sensor and the inner surface of the pipe lining material 13 is different, so that the contour of the generated two-dimensional image is not faithfully reproduced, However, the deviation of the contour shape is small and the approximate center of the two-dimensional image can be determined, allowing the drilling to be performed with the same alignment accuracy.

EMBODIMENT 2

In Embodiment 1, the photodetector 40 is fixed to the work robot 20 and moved in conjunction with the longitudinal movement of the work robot 20, but may be moved independently of the movement of the work robot 20 to scan the opening image 34. FIGS. 20 to 25 show such an embodiment.

Figure 20:
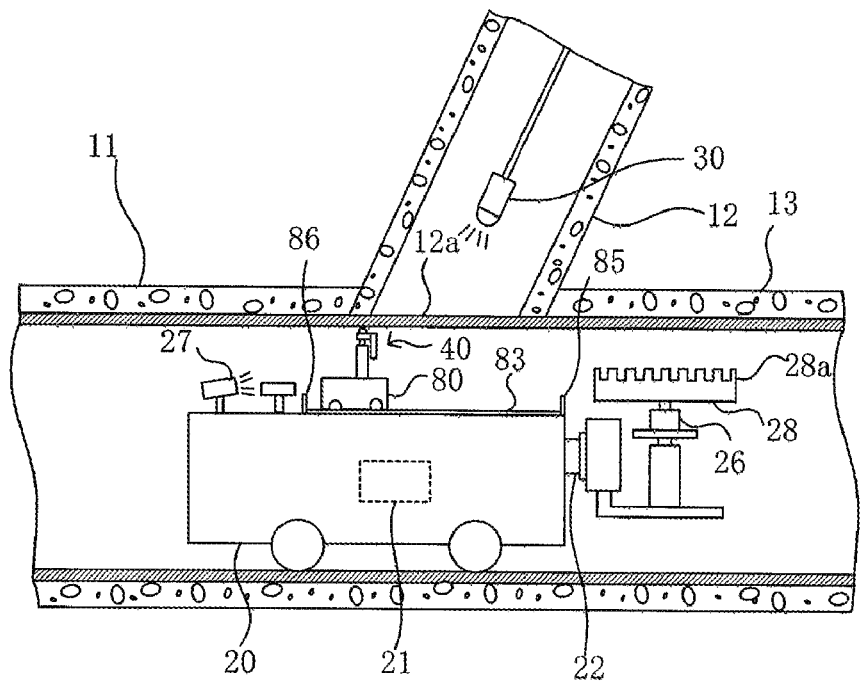
FIG. 20 is an illustrative view showing the scanning of the lateral pipe opening image using a scanning unit that runs on a work robot.
Figure 21:
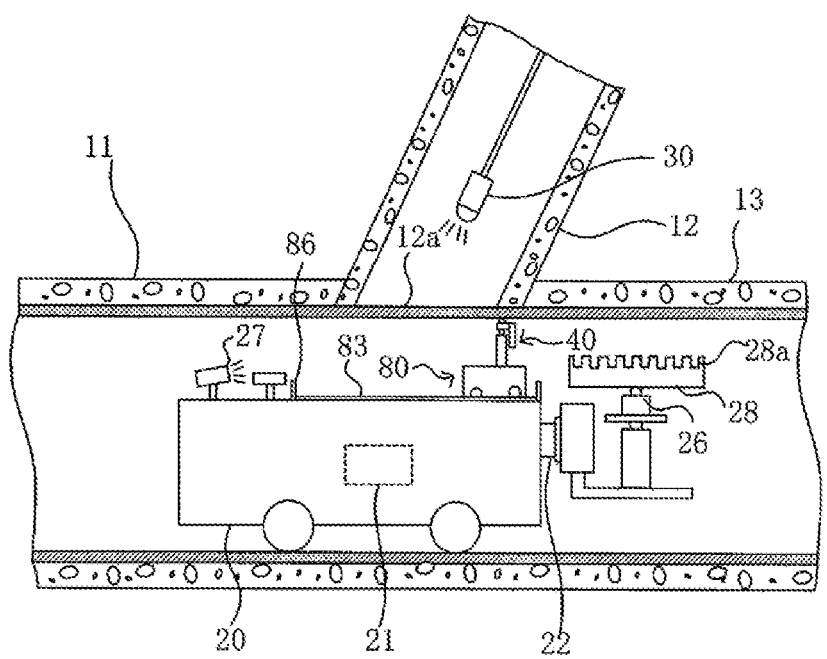
FIG. 21 is an illustrative view showing a state in which the opening image has been scanned using the scanning unit that runs on the work robot.
Figure 22:
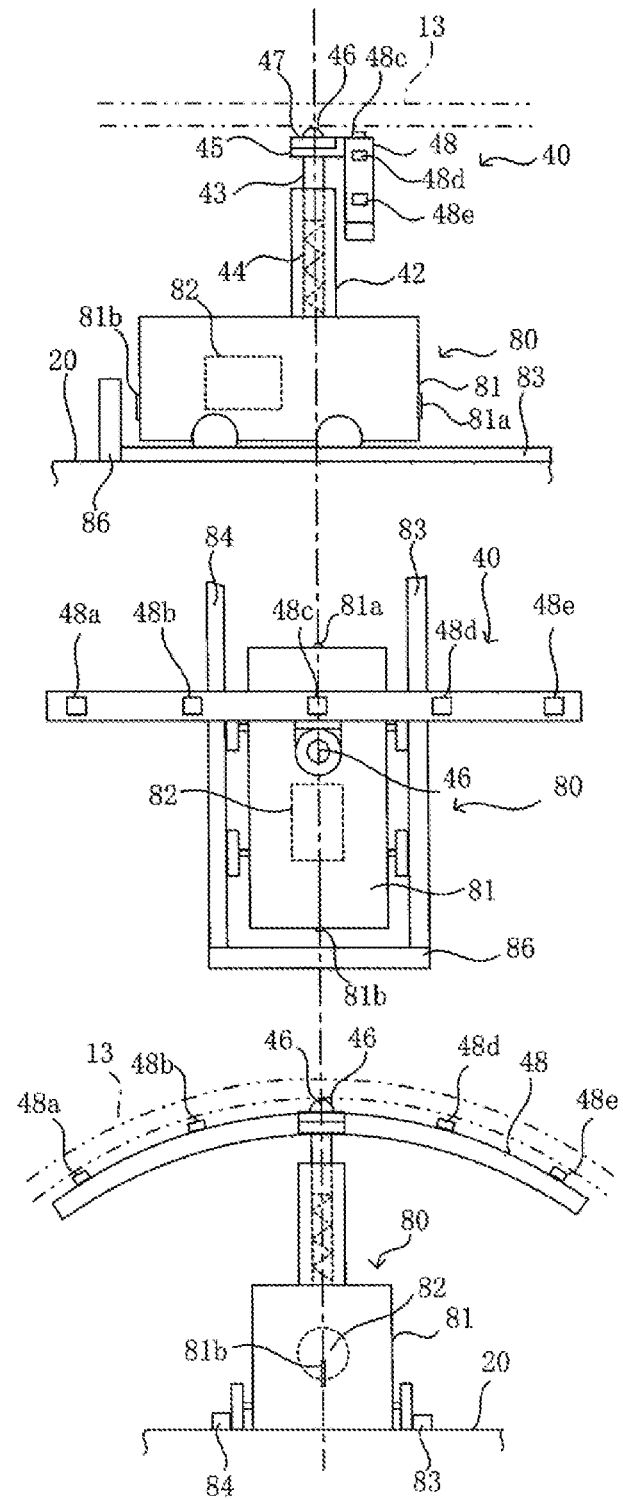
FIG. 22 is a side view, a top view and a front view showing a photodetector that is mounted on the scanning unit that runs on the work robot.

In Embodiment 2, a scanning unit 80 having four wheels and loaded with the photodetector 40 is used as shown in FIGS. 20 to 22. The scanning unit 80 is moved by a motor 82 provided inside a base 81, for example, by a stepping motor or a servomotor between stopper plates 85 and 86 on the flat portion of the work robot 20 in the longitudinal direction under guidance by guide rails 83, 84 arranged symmetrically with respect to the circumferential center of the work robot 20.

Limit switches 81a and 81b are attached to the front and rear of the base 81. When the scanning unit 80 moves forward or backward and strikes the stopper plates 85 and 86 fixed to the work robot 20, the limit switches 81a and 81b are operated to stop the motor 82 and prevent the scanning unit 80 from moving forward or backward beyond the stopper plates 85, 86. The photodetector 40 having the photodetector elements 48a to 48e is attached to the base 81 of the scanning unit 80 using the members 42 to 48 described with reference to FIG. 9.

With such a configuration, the scanning of the opening image 34 by the scanning unit 80 is performed in a flow similar to the flow shown in FIG. 11. It is assumed that the work robot 20 advances in a state of being turned somewhat clockwise by $\Delta\theta$ around the pipe axis 11a of the main pipe 11 and the scanning unit 80 stops at a position where it abuts on the rearmost portion, that is, the rear stopper plate 86 (FIG. 23).

Figure 23:
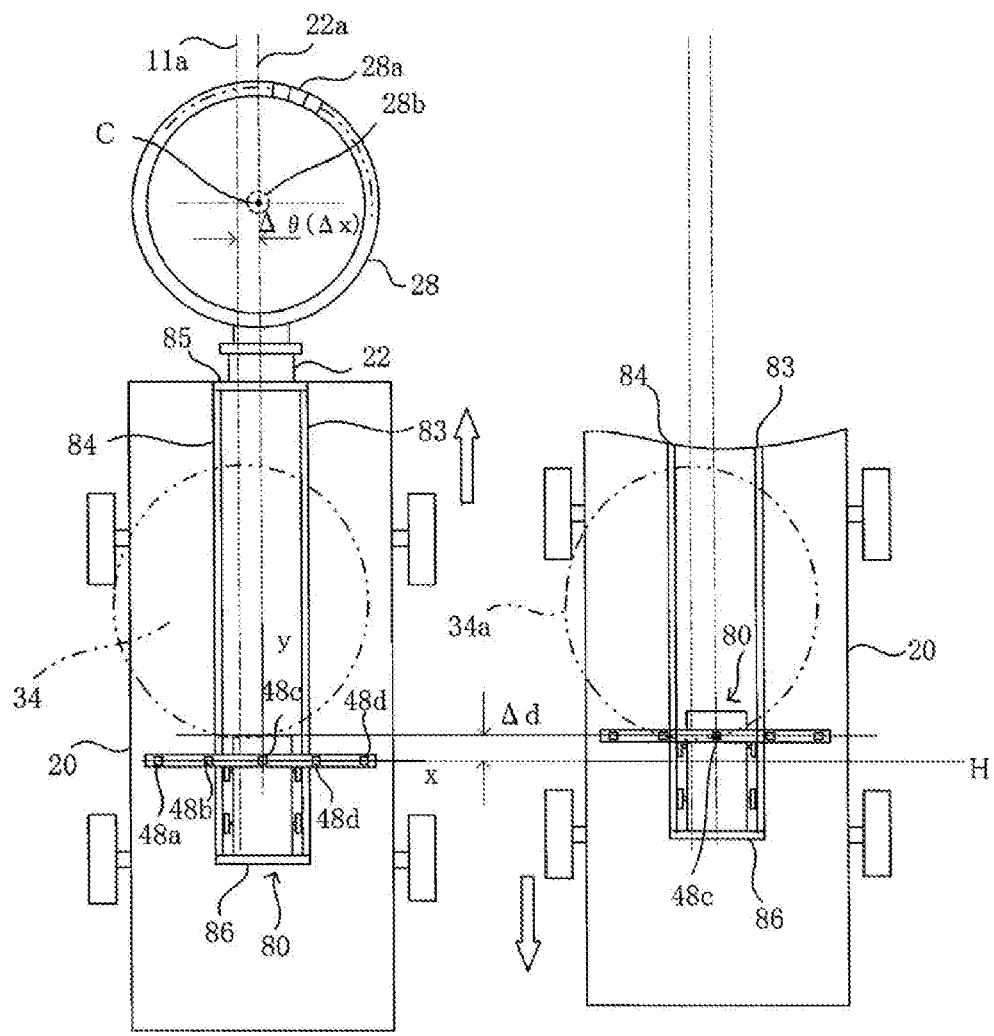
FIG. 23 is an illustrative view showing the scanning of the lateral pipe opening image using the scanning unit.

When the work robot 20 moves forward and one of the photodetector elements 48a to 48e (the central photodetector element 48c) of the photodetector 40 detects the contour of the opening image 34 as shown on the right side of FIG. 23, the work robot 20 is moved backward by a predetermined distance $\Delta d$ as shown on the left side of the drawing, and this position is set as the scanning start position H of the opening image 34 (steps S1 to S3). At the scanning start position H, the scanning unit 80 abuts against the stopper plate 86 and stops as described above. The axis that is parallel to the pipe axis 11a of the main pipe 11 and passes through the position of the central photodetector element 48c is set as the y-axis, and the horizontal axis that is orthogonal to the y-axis and passes through the scanning start position H of the central photodetector element 48c is set as the x-axis.

In Embodiment 1, the work robot 20 moves forward at the scanning start position H to scan the opening image (step S4), but in Embodiment 2, the work robot 20 is kept stopped at the scanning start position H, and the scanning unit 80 advances on the work robot 20 to scan the opening image 34.

Figure 24:
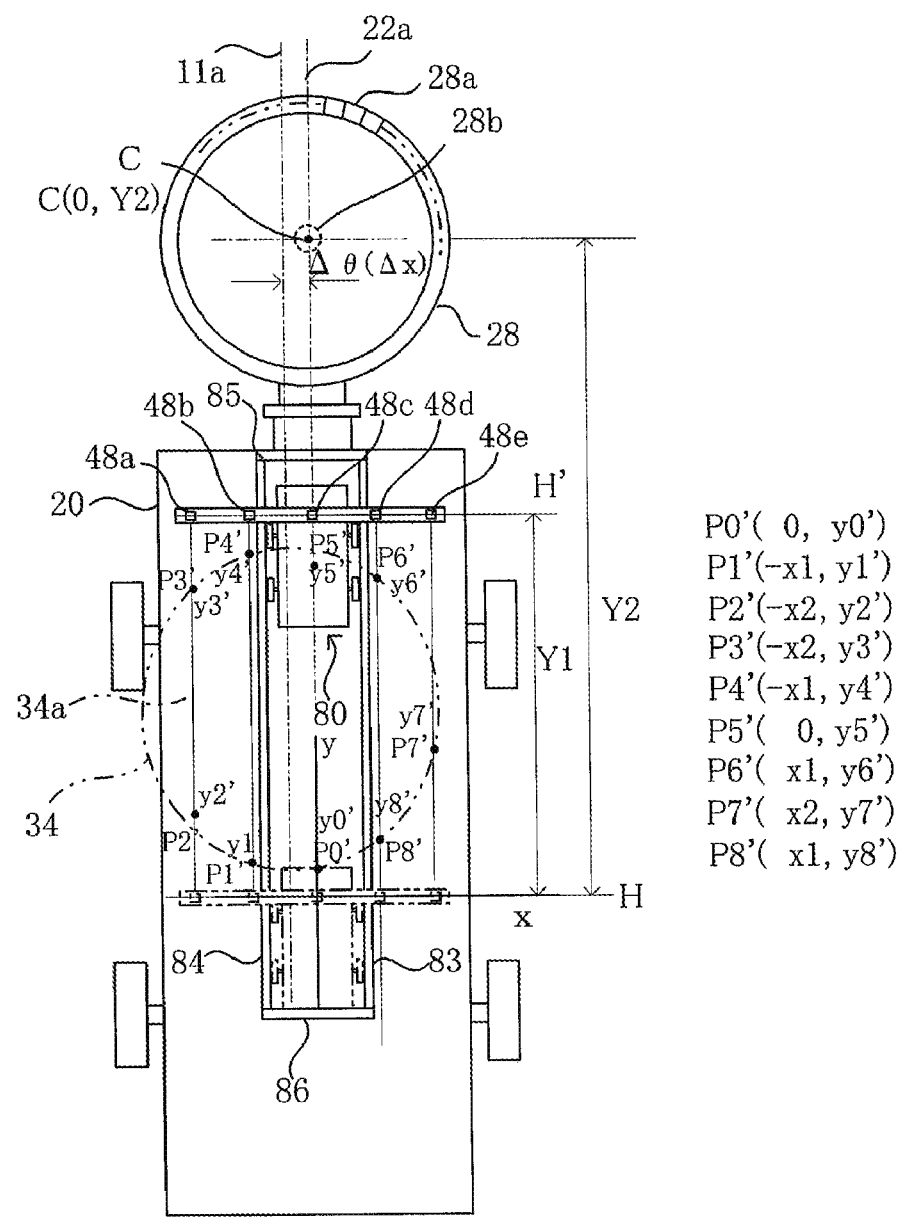
FIG. 24 is an illustrative view showing the detection of the contour points on the lateral pipe opening image using the scanning unit.
Figure 25:
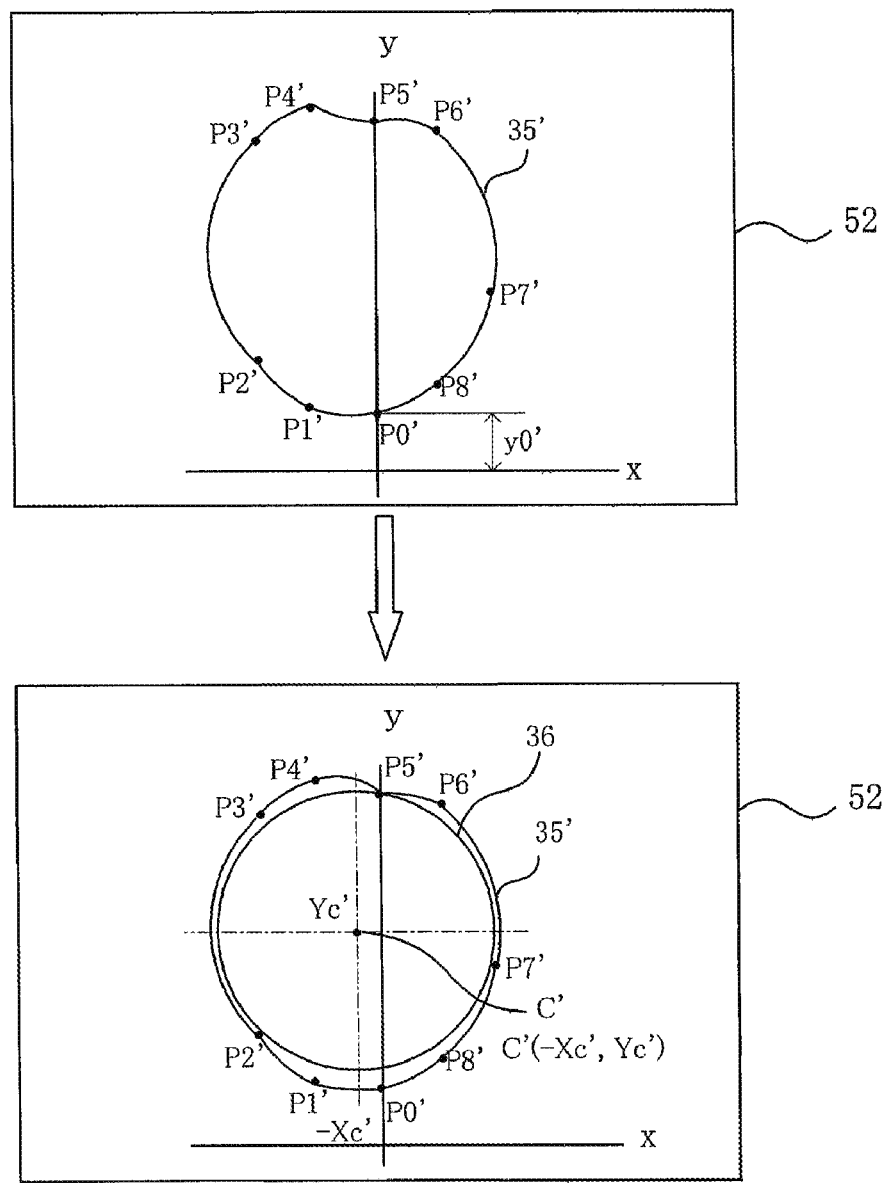
FIG. 25 is an illustrative view showing a state in which the template for the drilling blade is aligned with the two-dimensional image of the opening image that is acquired using the scanning unit.

As the scanning unit 80 advances, the photodetector 40 also moves in the longitudinal direction. As shown in FIG. 24, the photodetector elements 48a to 48e move from the scanning start position H by a distance Y1 to detect the contour points P1 to P8 of the opening image 34, and the scanning unit 80 stops at the scanning end position H'.

The movement distances y0' to y8' of the photodetector elements 48a to 48e from the scanning start position H until the contour points P1 to P8 are detected are the same as those in Embodiment 1 and can be obtained by multiplying the movement speed of the scanning unit 80 by the time until the respective contour points are detected. The arrangement of the photodetector elements 48a to 48e in the x axis direction is the same as that in Embodiment 1, so that the coordinate values of the contour points P0' to P8' as shown on the right side of FIG. 24 are calculated.

As in Embodiment 1, the contour points P0' to P8' are interpolated if necessary to add contour points. The contour points P0' to P8' and the added contour points are connected by spline curves, for example, to generate a two-dimensional image 35' showing the contour of the opening image 34 shown in the upper part of FIG. 25 (step S6).

Subsequently, the two-dimensional image 35' is displayed on the display unit 52 (step S7), and its center C'(−Xc', Yc') is obtained in the same manner as in Embodiment 1 (step S8).

On the other hand, the work robot 20 stops at the scanning start position H when the opening image 34 is scanned, and the axial center C of the rotary shaft 28b of the drilling blade 28 is at the coordinate position of C(0, Y2). Y2 is a distance in the y-axis direction (longitudinal direction) from the axial center C to the scanning start position H. This distance is determined by the position of the stopper plate 86 mounted on the work robot 20 and the design values of the work robot 20 and the scanning unit 80, and does not depend on the movement of the scanning unit 80.

Subsequently, the amount of positional deviation between the center C'(−Xc', Yc') of the two-dimensional image 35' and the axial center C(0, Y2) of the drilling blade 28 is calculated (step S9). In the direction in which the positional deviation is eliminated, the drilling blade 28 is moved in the longitudinal and circumferential directions of the main pipe by the amount of positional deviation, and the pipe lining material 13 is then drilled (steps S10, S11). When the drilling is finished or when the scanning of the opening image is completed, the scanning unit 80 is moved backward until it abuts against the stopper plate 86 and is kept on standby for scanning the next opening image.

In Embodiment 2, the work robot 20 doesn't move but the scanning unit 80 moves instead on the work robot 20 independently thereof to scan the opening image 34. Since the scanning unit 80 can move on the flat portion of the work robot 20, it can be moved smoothly and stably as compared with the working robot 20 that moves on the curved surface. This allows the contour points of the opening mage to be detected with high accuracy.

In order to move the scanning unit 80 at a constant speed without slipping, a sheet with a large coefficient of friction may be laid over the travelling path on the work robot 20 where the scanning unit 80 moves. Alternatively, a gear may be formed on the entire periphery of the wheel of the scanning unit, and a gear meshing with that gear may be provided on the guide rail to provide a meshing mechanism to move the scanning unit.

The photodetector 40 is configured by arranging individual photodetector elements, but as in Embodiment 1, it is also possible to use a one-dimensional image sensor of CCD or CMOS shown in FIGS. 15 and 19 in which minute photodetector elements are one-dimensionally arranged at equal intervals with fine pitches.

EMBODIMENT 3

In Embodiments 1 and 2 as described above, the sensor mount 48 of the photodetector 40 is curved according to the curvature of the main pipe 11 or the pipe lining material 13 thereof. Therefore, if the pipe diameter of the main pipe 11 or the layer thickness of the pipe lining material is different, it is necessary to use a sensor mount having a curvature corresponding thereto. Here, each of the photodetector elements 48a to 48d of the photodetector 40 is attached to an individual sensor mount and is urged by a spring independently to make constant the distance between each detection surface and the inner surface of the pipe lining material even if the pipe diameter of the main pipe 11 or the layer thickness of the pipe lining material is different.

Figure 26:
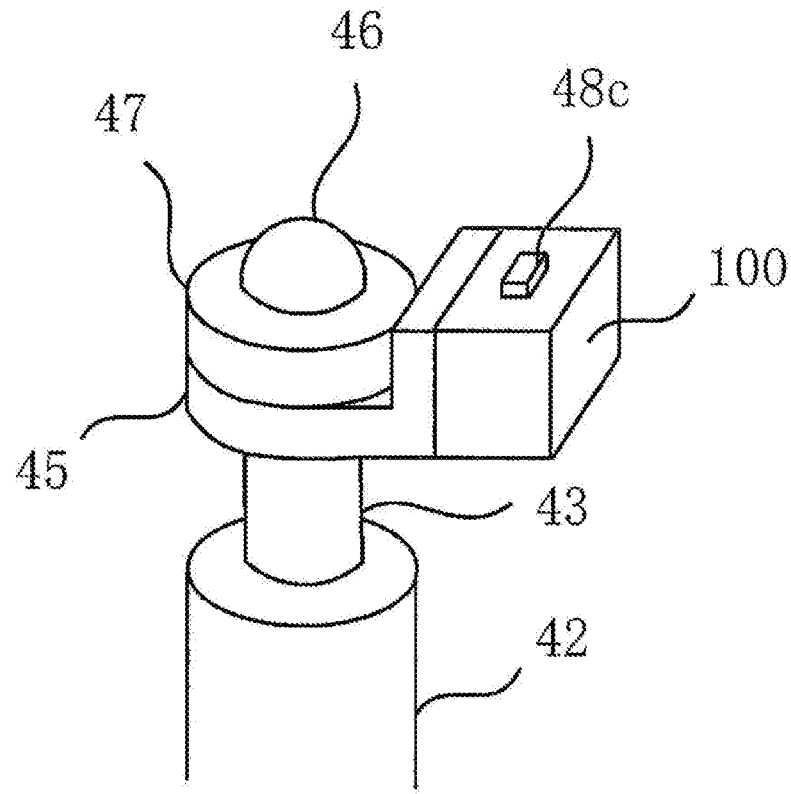
FIG. 26 is a perspective view showing another arrangement of a photodetector element.

FIG. 26 shows an attachment of the photodetector element 48c at the center of the photodetector 40. The photodetector element 48c is attached to the sensor holder 45 using a block-shaped sensor mount 100 separately from other photodetector elements. The other photodetector elements 48a, 48b, 48d, and 48e have the same structure.

Figure 27:
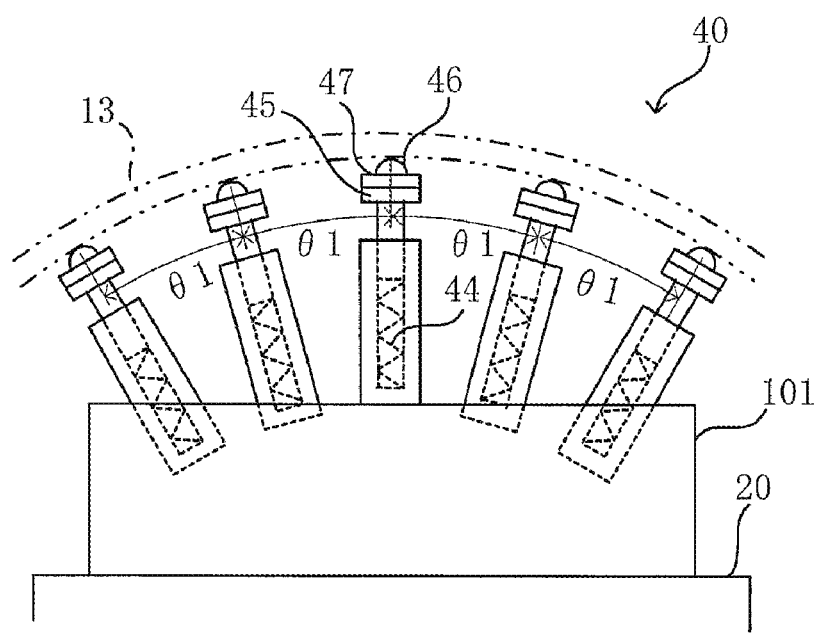
FIG. 27 is a front view showing a photodetector according to another embodiment.
Figure 28:
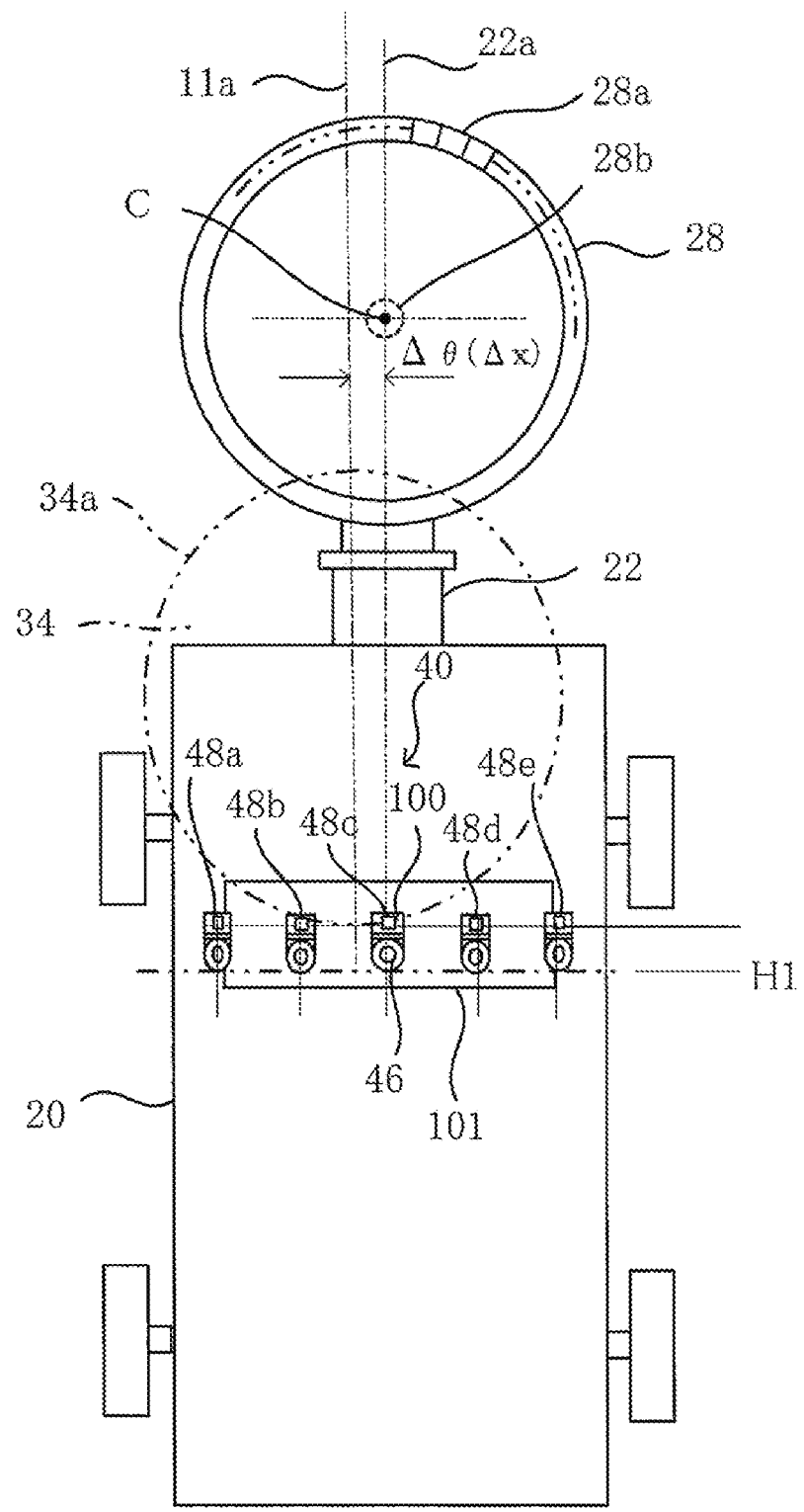
FIG. 28 is an illustrative view showing the scanning of the lateral pipe opening image using the photodetector in FIG. 27.
Figure 29:
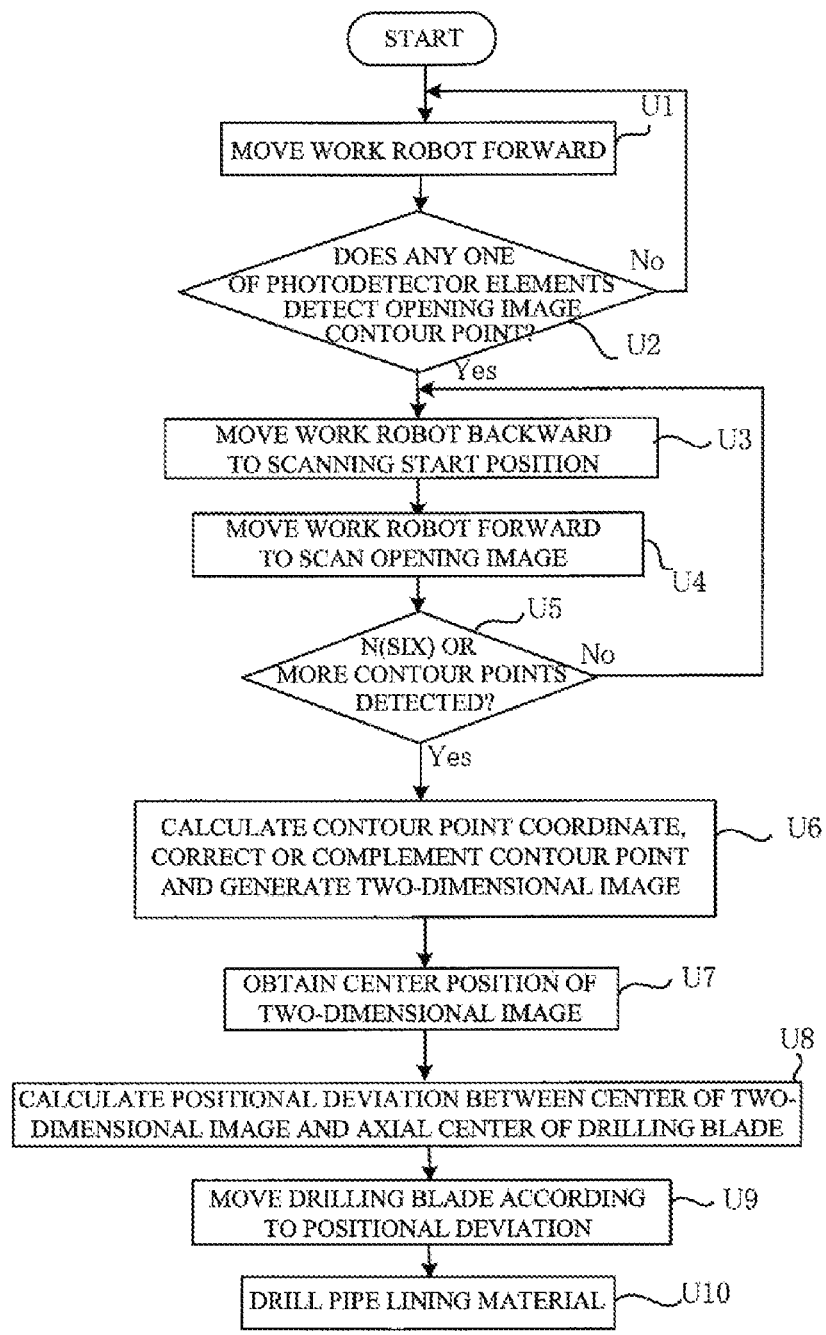
FIG. 29 is a flowchart showing the flow of drilling steps using the photodetector in FIG. 27.

As shown in FIGS. 27 and 28, all the photodetector elements 48a to 48e of the photodetector 40 are arranged at equal angles θ1 in the circumferential direction of the main pipe on a base 101 fixed to the work robot 20. Each of the photodetector elements 48a to 48e of the photodetector 40 is urged upward by the spring 44 independently of the other photodetector elements, so that the ball 46 is respectively brought into point contact with the inner surface of the pipe lining material 13 to make constant the distance between the detection surface of each of the photodetector elements 48a to 48e and the inner surface of the pipe lining material. Therefore, it is possible to scan the opening image with the same sensitivity even if the pipe diameter of the main pipe 11 or the layer thickness of the pipe lining material 13 is different, The drilling apparatus in Embodiment 3 has the same configuration as in Embodiment 1 except that the photodetector 40 is configured as shown in FIG. 26 and FIG. 27. The drilling of the pipe lining material 13 is performed in accordance with the flow as shown in FIG. 29. In FIG. 29, steps U1 to U5 are the same as steps S1 to S5 in FIG. 11.

Figure 30:
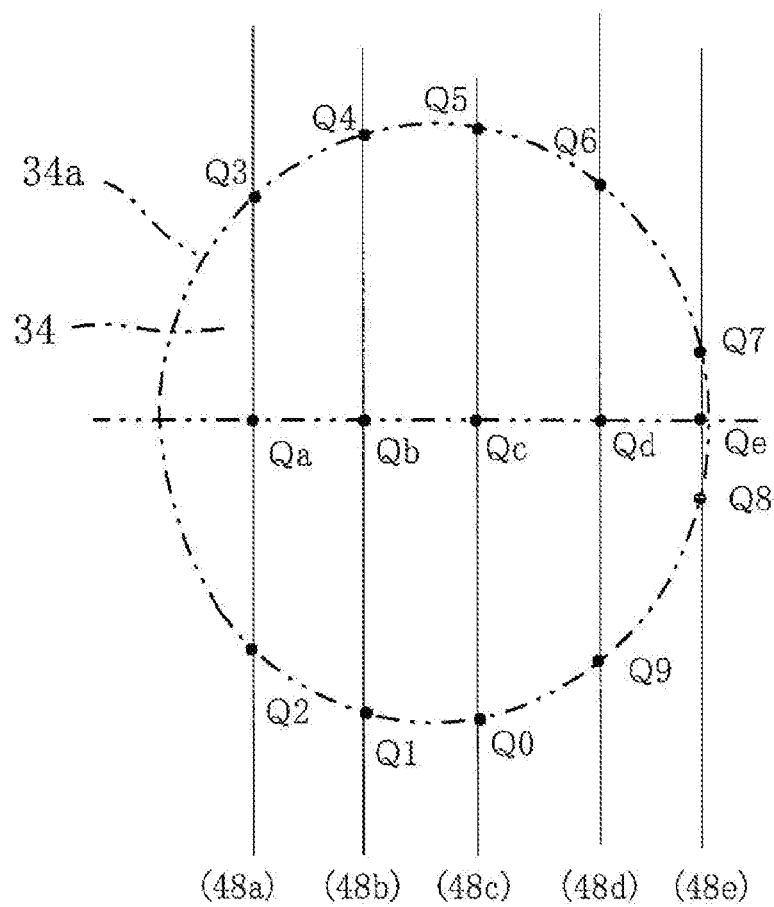
FIG. 30 is an illustrative view showing the scanning of an ideal lateral pipe opening image.

When the contour of the opening image 34 is sharp and there is no cutout portion as shown in FIG. 30, the photodetector elements 48a to 48e of the photodetector 40 detect the first contour points Q2, Q1, Q0, Q9, Q8 in accordance with forward movement of the work robot 20 and then detects the rear contour points Q3, Q4, Q5, Q6, Q7.

Figure 32:
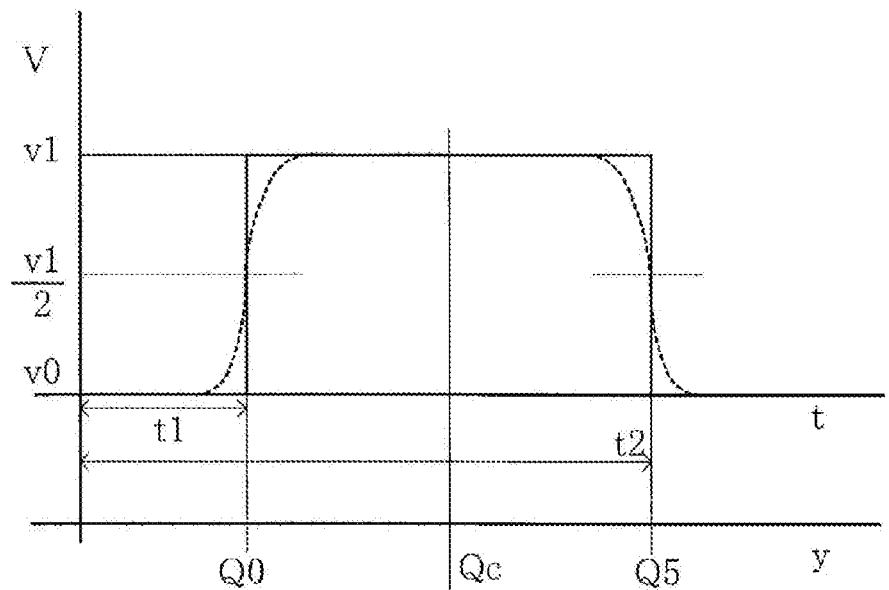
FIG. 32 is a graphical view showing the output waveforms obtained from the photodetector elements.
Figure 32:
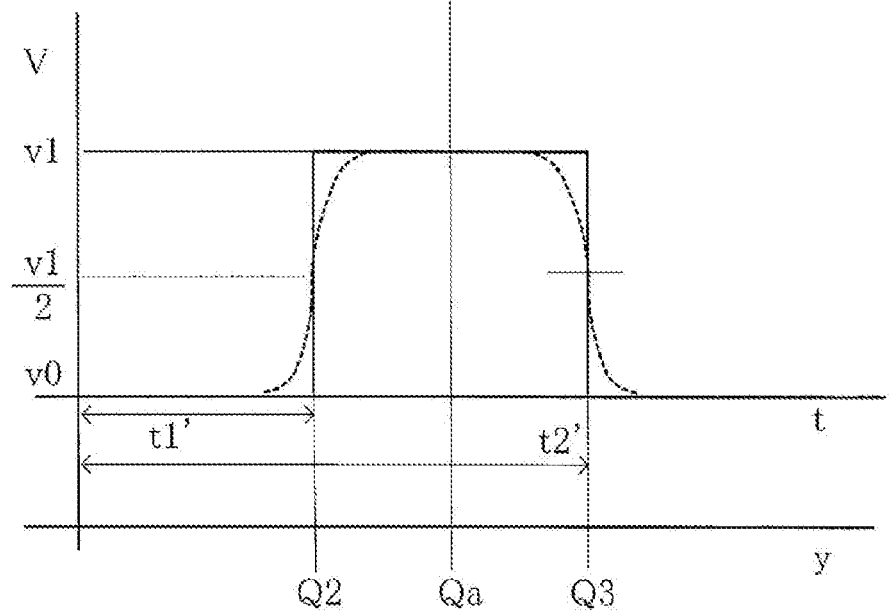

For example, the photodetector element 48c at the center of the photodetector 40 generates an output signal as shown in the upper part of FIG. 32 and detects the contour point Q0 at time t1 and the contour point Q5 at time t2. Assuming that one of the other photodetector elements, for example, the photodetector element 48a has the same sensitivity as the photodetector element 48c, it generates the same output signal as shown in the lower stage, and detects the contour point Q2 at time t1' and the contour point Q3 at time t2'.

The distance between the contour points Q0 and Q5 detected by the photodetector element 48c differs from the distance between the contour points Q2 and Q3 detected by the photodetector element 48a, but the centers Qc and Qa thereof are substantially the same if their waveforms are identical. The same applies to other photodetector elements. Ideally, the centers Qa to Qe of distances between the contour points (Q2, Q3), (Q1, Q4), (Q0, Q5), (Q9, Q6), (Q8, Q7) detected by the respective photodetector elements 48a to 48e have the same y-axis coordinate value, as shown in FIG. 30.

Figure 31:
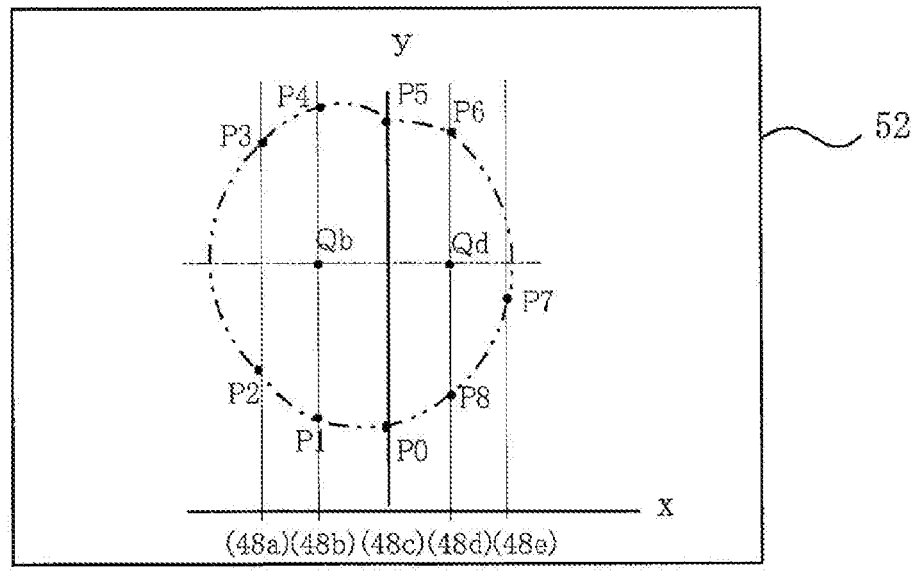
FIG. 31 is an illustrative view showing the contour points detected on the lateral pipe opening image.
Figure 31:
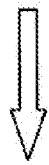
Figure 31:
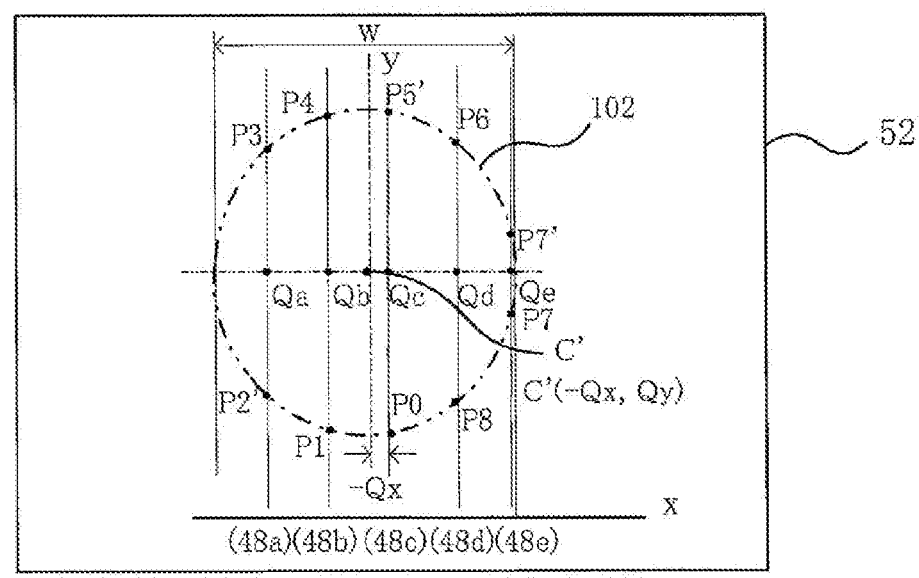

Actually, the contour points P0 to P8 similar to those shown in FIG. 14 are detected, and as shown in the upper part of FIG. 31, each contour point is connected by an imaginary line of a two-dot chain line and displayed on the display unit 52. As described with reference to FIG. 14, the contour points P2 and P5 are inaccurate because the contour of the opening image 34 is unclear, and the photodetector element 48e detects only the front contour point P7.

Here, the image displayed on the display unit 52 is viewed to select the photodetector element considered to have successfully detected the contour point. In the example of FIG. 31, the photodetector elements 48b and 48d are selected to derive therefrom one of the centers Qb and Qd of the distances P1 to P4, P8 to P6 between the contour points, or the average thereof.

The contour points detected are corrected based on the fact that the center of distance between the front contour point and the rear contour point detected by each of the photodetector elements 48a to 48e is ideally the same. In this example, the contour points P2, P5 are inaccurate and the photodetector element 48e detects only the front contour point P7. Therefore, the contour point P2 is corrected to P2', the contour point P5 to P5', and the contour point P7' is complemented so that the centers Qa, Qc, Qe of the contour point distances may have the same value as Qb Qd, as shown in the lower part of FIG. 31. Each contour point including the contour points thus corrected or complemented is connected by a spline curve to generate a two-dimensional image 102 (step U6).

Subsequently, the center C' of the generated two-dimensional image 102 is obtained (step U7). The centers Qa to Qe of the distances between the contour points detected by the respective photodetector elements correspond to the y-coordinate of the center of the two-dimensional image. Therefore, either one of the centers Qa to Qe or the average Qy thereof is set as the y-coordinate of the center C' of the two-dimensional image 102. Furthermore, a sign Qx is added to the distance in the x-axis direction between the center line of the width w of the two-dimensional image 102 and the line connecting the contour points P0, P5' to set −Qx as the x-coordinate of the center C' of the two-dimensional image 102.

Subsequently, in step U8, the positional deviation between the center of the two-dimensional image 102 and the axial center position of the rotary shaft of the drilling blade is obtained in the longitudinal and circumferential directions. The amount of positional deviation in the longitudinal direction is a value obtained by subtracting the y-coordinate value of the center C' of the two-dimensional image 102 from (D1+D2), and the amount of positional deviation in the circumferential direction is the angle (Δθ) corresponding to Qx. Therefore, the drilling blade 28 is moved backward by the amount of positional deviation, and the drilling blade 28 is turned counterclockwise by Δθ around the pipe axis (step U9).

The drilling blade 28 is thus positioned at the correct position. The hydraulic cylinder 25 is then driven to raise the drilling blade 28, and the drilling blade 28 is rotated to drill the pipe lining material 13 that blocks the lateral pipe opening 12a (step U10).

In Embodiment 3, the contour point detected by the photodetector element is corrected, or the contour point which could not be detected by the photodetector element is complemented. This allows the two-dimensional image 102 faithful to the opening section image 34 to be generated. Therefore, the center of the two-dimensional image, i.e., the center of the opening image can be obtained by a simple method without using the template as in Embodiment 1.

In Embodiment 3, the photodetector 40 is mounted on the work robot 20 and moves in conjunction with the longitudinal movement of the work robot 20. However, as in Embodiment 2, the photodetector 40 can also be moved on the work robot 20 in the longitudinal direction independently of the movement of the work robot 20.

KEY TO THE SYMBOLS 11 main pipe
12 lateral pipe
12a lateral pipe opening
13 pipe lining material
14 work truck
15 cable pipe
20 work robot
21 motor
22 motor
25 cylinder
26 motor
27 television camera
28 drilling blade
28a blade surface
29 bracing member
30 lighting device
34 opening image
35 two-dimensional image
36 template
40 photodetector
46 ball
47 ball bearing
48 sensor mount
48a to 48e photodetector elements
50 computer
50c image processing unit
50d image generating unit
50e positional deviation calculation unit
51 storage device
52 display unit
70 one-dimensional image sensor
72 two-dimensional image
75a to 75e one-dimensional image sensor
80 scanning unit
81 base
81a, 81b limit switch
82 motor
83, 84 guide rail
85, 86 stopper plate

The invention claimed is:

1. A drilling apparatus for drilling a pipe lining material from a main pipe side wherein illumination light from a lateral pipe passes through the pipe lining material that blocks a lateral pipe opening and an opening image corresponding to the lateral pipe opening is formed on the inner surface of the pipe lining material comprising:
a rotatable drilling blade for drilling the pipe lining material;
a work robot that moves in the longitudinal direction inside a main pipe with the drilling blade mounted thereon so as to be capable of turning in the circumferential direction about an axis extending in the longitudinal direction of the main pipe;
a photodetector having a plurality of photodetector elements arranged in the circumferential direction of the main pipe to scan the opening image in the longitudinal direction and detect its contour points;
an image generating means for generating a two-dimensional image indicating the contour of the opening image based on the contour points detected by the photodetector; and
a calculation means for calculating a positional deviation in the longitudinal and circumferential directions between the center position of the generated two-dimensional image and the axial center position of the rotary shaft of the drilling blade;
wherein the pipe lining material is drilled by moving the drilling blade in the longitudinal direction and turning it in the circumferential direction by the amount of positional deviation in a direction in which the positional deviation is eliminated.

2. A drilling apparatus according to claim 1, wherein the photodetector is mounted on the work robot and moves in conjunction with longitudinal movement of the work robot.

3. A drilling apparatus according to claim 1, wherein the photodetector moves on the work robot in the longitudinal direction independently of movement of the work robot.

4. A drilling apparatus according to claim 1, wherein each of the photodetector elements of the photodetector is urged upward by a spring individually so that the distance between each detection surface and the inner surface of the pipe lining material is constant.

5. A drilling apparatus according to claim 1, wherein each of the photodetector elements of the photodetector is mounted on a mount curved at a curvature corresponding to the pipe diameter of the main pipe and the layer thickness of the pipe lining material so that the distance between the respective detection surface and the inner surface of the pipe lining material is constant.

6. A drilling apparatus according to claim 1, wherein the photodetector element of the photodetector is a CdS cell or a photodiode.

7. A drilling method for drilling a pipe lining material from a main pipe side wherein illumination light from a lateral pipe passes through the pipe lining material that blocks a lateral pipe opening and an opening image corresponding to the lateral pipe opening is formed on the inner surface of the pipe lining material comprising:
moving in the longitudinal direction of the main pipe a work robot on which a rotatable drilling blade for drilling the pipe lining material is mounted so as to be capable of turning about an axis extending in the longitudinal direction of the main pipe;
scanning in the longitudinal direction the opening image formed on the inner surface of the pipe lining material by the illumination light and detecting its contour points using a photodetector having a plurality of photodetector elements arranged in the circumferential direction of the main pipe;
generating a two-dimensional image indicating the contour of the opening image based on the contour points detected and calculating a positional deviation in the longitudinal and circumferential directions between the center position of the generated two-dimensional image and the axial center position of the rotary shaft of the drilling blade; and
drilling the pipe lining material by moving the drilling blade in the longitudinal direction and turning it in the circumferential direction by the amount of positional deviation in a direction in which the positional deviation is eliminated.

8. A drilling method according to claim 7, wherein the center position of the generated two-dimensional image is obtained by template matching with a template having a shape corresponding to the shape drawn by the drilling blade.

9. A drilling method according to claim 7, wherein the generated two-dimensional image has its contour points corrected or complemented so that the center of the distance between the first contour point detected by each photodetector element of the photodetector and the next contour point is the same for each photodetector element.

\* \* \* \* \*